US008095138B2

(12) United States Patent
Matsumoto et al.

(10) Patent No.: US 8,095,138 B2
(45) Date of Patent: Jan. 10, 2012

(54) RESOURCE ALLOCATION APPARATUS, CENTRAL CONTROL APPARATUS, WIRELESS BASE STATION, WIRELESS COMMUNICATION SYSTEM, RESOURCE ALLOCATION METHOD AND RESOURCE ALLOCATION PROGRAM IN COMPUTER-READABLE MEDIUM

(75) Inventors: Akira Matsumoto, Tokyo (JP); Tetsuya Ito, Tokyo (JP); Hiroyuki Iizuka, Tokyo (JP); Yuichiro Ezure, Tokyo (JP)

(73) Assignee: NEC Communication Systems, Ltd., Tokyo (JP)

( * ) Notice: Subject to any disclaimer, the term of this patent is extended or adjusted under 35 U.S.C. 154(b) by 1212 days.

(21) Appl. No.: 11/826,191

(22) Filed: Jul. 12, 2007

(65) Prior Publication Data

US 2008/0014954 A1 Jan. 17, 2008

(30) Foreign Application Priority Data

Jul. 13, 2006 (JP) ................................ 2006-193084
Jul. 6, 2007 (JP) ................................ 2007-178602

(51) Int. Cl.
*H04W 72/00* (2009.01)

(52) U.S. Cl. ..... 455/445; 455/450; 455/447; 455/452.1; 370/328; 370/329

(58) Field of Classification Search .................. 455/450, 455/445, 447, 451, 452.1, 452.2, 453; 370/328, 370/329
See application file for complete search history.

(56) References Cited

U.S. PATENT DOCUMENTS

| | | | | |
|---|---|---|---|---|
| 6,370,384 | B1 * | 4/2002 | Komara | 455/447 |
| 7,136,655 | B2 * | 11/2006 | Skafidas et al. | 455/450 |
| 2005/0152305 | A1 * | 7/2005 | Ji et al. | 370/328 |
| 2005/0208949 | A1 | 9/2005 | Chiueh | |
| 2006/0029028 | A1 * | 2/2006 | Kim et al. | 370/338 |
| 2008/0090575 | A1 * | 4/2008 | Barak et al. | 455/444 |
| 2008/0165732 | A1 * | 7/2008 | Kim et al. | 370/329 |

FOREIGN PATENT DOCUMENTS

| | | |
|---|---|---|
| JP | 2002345016 | * 9/2002 |
| JP | 2002-345016 | 11/2002 |
| JP | 3600568 | 9/2004 |

OTHER PUBLICATIONS

ISO/IEC 8802-11, "IEEE Standard for InformationTechnology—Telecommunications and information exchange between systems—Local and metropolitan area networks—Specific requirements: Part 11: Wireless LAN Medium Access Control (MAC) and Physical (PHY) Specifications", ANSI/IEEE Std 802.11, 1999 Edition, pp. 1-7.

* cited by examiner

*Primary Examiner* — Lester Kincaid
*Assistant Examiner* — Mehmood B Khan
(74) *Attorney, Agent, or Firm* — McGinn IP Law Group, PLLC

(57) ABSTRACT

A wireless communication system allocates resource information used in performing wireless communication to wireless base stations in order not to generate interference between access-side wireless interfaces and backbone-side wireless interfaces. Each of the wireless base stations includes an access-side wireless interface for covering wireless terminal devices and a backbone-side wireless interface for connecting the wireless base stations with each other. The wireless base station allocates resource information that is common to the wireless base stations to the backbone-side wireless interface that performs the wireless communication between the wireless base stations, and allocates resource information that does not generate interference with the backbone-side wireless interface to the access-side wireless interface.

1 Claim, 27 Drawing Sheets

| NUMBER | NAME | THE NUMBER OF AVAILABLE WIRED I/Fs (411) | THE TOTAL NUMBER OF WIRED I/Fs (412) | THE NUMBER OF UNGROUPED WIRELESS I/Fs (413) | THE TOTAL NUMBER OF WIRELESS I/Fs (414) | THE NUMBER OF ADJACENT WIRELESS BASE STATIONS (415) | THE NUMBER OF COVERABLE WIRELESS TERMINAL DEVICES (416) | CHANNEL SCAN INFORMATION (417) |
|---|---|---|---|---|---|---|---|---|
| 1 | A | 1 | 1 | 3 | 3 | 2 | 3 | 10,44,… |
| 2 | B | 0 | 1 | 4 | 4 | 3 | 2 | 0,7,… |
| 3 | C | 0 | 2 | 2 | 2 | 2 | 3 | 11,0,… |
| 4 | D | 0 | 1 | 3 | 3 | 1 | 1 | 40,60,… |

| NUMBER | NAME | THE NUMBER OF AVAILABLE WIRED I/Fs (411) | THE TOTAL NUMBER OF WIRED I/Fs (412) | THE NUMBER OF UNGROUPED WIRELESS I/Fs (413) | THE TOTAL NUMBER OF WIRELESS I/Fs (414) | THE NUMBER OF ADJACENT WIRELESS BASE STATIONS (415) | THE NUMBER OF COVERABLE WIRELESS TERMINAL DEVICES (416) | CHANNEL SCAN INFORMATION (417) |
|---|---|---|---|---|---|---|---|---|
| 1 | A | 1 | 1 | 3 | 3 | 2 | 3 | 10,44,··· |
| 2 | C | 0 | 2 | 2 | 2 | 2 | 3 | 11,0,··· |
| 3 | D | 0 | 1 | 3 | 3 | 1 | 1 | 40,60,··· |
| 4 | B | 0 | 1 | 4 | 4 | 3 | 2 | 0,7,··· |

| NUMBER | NAME | THE NUMBER OF AVAILABLE WIRED I/Fs (411) | THE TOTAL NUMBER OF WIRED I/Fs (412) | THE NUMBER OF UNGROUPED WIRELESS I/Fs (413) | THE TOTAL NUMBER OF WIRELESS I/Fs (414) | THE NUMBER OF ADJACENT WIRELESS BASE STATIONS (415) | THE NUMBER OF COVERABLE WIRELESS TERMINAL DEVICES (416) | CHANNEL SCAN INFORMATION (417) |
|---|---|---|---|---|---|---|---|---|
| 1 | A | 1 | 1 | 2 | 3 | 2 | 3 | 10,44,… |
| 2 | C | 0 | 2 | 1 | 2 | 2 | 3 | 11,0,… |
| 3 | D | 0 | 1 | 3 | 3 | 1 | 1 | 40,60,… |
| 4 | B | 0 | 1 | 3 | 4 | 3 | 2 | 0,7,… |

| NUMBER | NAME | THE NUMBER OF AVAILABLE WIRED I/Fs (411) | THE TOTAL NUMBER OF WIRED I/Fs (412) | THE NUMBER OF UNGROUPED WIRELESS I/Fs (413) | THE TOTAL NUMBER OF WIRELESS I/Fs (414) | THE NUMBER OF ADJACENT WIRELESS BASE STATIONS (415) | THE NUMBER OF COVERABLE WIRELESS TERMINAL DEVICES (416) | CHANNEL SCAN INFORMATION (417) |
|---|---|---|---|---|---|---|---|---|
| 1 | A | 1 | 1 | 1 | 3 | 2 | 3 | 10,44,··· |
| 2 | C | 0 | 2 | 1 | 2 | 2 | 3 | 11,0,··· |
| 3 | D | 0 | 1 | 1 | 3 | 1 | 1 | 40,60,··· |
| 4 | B | 0 | 1 | 1 | 4 | 3 | 2 | 0,7,··· |

| NUMBER | NAME | CONFIGURATION NODE | VIRTUAL NODE CHANNEL SCAN INFORMATION | ALLOCATION CHANNEL |
|---|---|---|---|---|
| 1 | GROUP 1 | A,B,C | 7,17,··· | |
| 2 | GROUP 2 | A,B,D | 17,37,··· | |
| 3 | GROUP 3 | B,D | 20,34,··· | |

RESOURCE ALLOCATION APPARATUS, CENTRAL CONTROL APPARATUS, WIRELESS BASE STATION, WIRELESS COMMUNICATION SYSTEM, RESOURCE ALLOCATION METHOD AND RESOURCE ALLOCATION PROGRAM IN COMPUTER-READABLE MEDIUM

This application is based upon and claims the benefit of priority from Japanese patent application No. 2006-193084, filed on Jul. 13, 2006 and No. 2007-178602, filed on Jul. 6, 2007, the disclosures of which are incorporated herein in its entirety by reference.

BACKGROUND OF THE INVENTION

1. Field of Invention

The present invention pertains to a resource allocation apparatus, a central control apparatus, a wireless base station, a wireless communication system, a resource allocation method and a resource allocation program in a computer-readable medium, for allocating resource information needed to perform wireless communication for a wireless base station including an access-side wireless interface for covering wireless terminal devices and a backbone-side wireless interface for connecting wireless base stations with each other.

2. Description of Related Art

Recently, in a case where wireless base stations are installed, a wireless mesh network is desired to be connected not with cables, but wirelessly for easiness of installation, tolerance for failures or the like.

In this case, to improve capacity between the wireless base stations, it is considered to mount a plurality of wireless network interfaces in the wireless base stations.

When a 2.4 GHz wireless LAN is applied, as non-interfering (non-overlapping) wireless channels in frequency allocation in the 2.4 GHz wireless LAN, there is a maximum of only three channels (for example, 1ch, 6ch, and 11ch) within the United States.

However, since maximum ranges of the wireless channels are different depending on wireless methods and countries, the number of non-interfering (non-overlapping) wireless channels is also different depending on the wireless methods and countries.

Therefore, the wireless base stations including a number of wireless network interfaces have a problem of channel interference.

When channel interference occurs, network performance worsens.

For this reason, to prevent channel interference, Japanese Patent No. 3600568 (document 1) discloses a wireless communication apparatus enabling an empty channel that is not used for communication to be automatically set as a communication channel.

However, a technique of document 1 can be applied only to an access-side wireless interface for covering wireless terminal devices.

Therefore, in a case where the technique of document 1 is applied to a backbone-side wireless interface for connecting wireless base stations with each other, non-overlapping wireless channels are allocated, so that the wireless channels cannot be shared, and consequently, communication between the wireless base stations cannot be performed.

For this reason, the technique of document 1 cannot be applied to a wireless base station configured to include an access-side wireless interface and a backbone-side wireless interface.

US 2005/0208949 (document 2) discloses a channel allocation method of performing channel allocation according to traffic for a backbone-side wireless interface.

However, a technique of document 2 is used to perform channel allocation according to traffic for the backbone-side wireless interface only and does not consider channel allocation associated with the access-side wireless interface.

Therefore, in the technique of document 2, interference between the backbone-side wireless interface and the access-side wireless interface occurs.

For this reason, the technique of document 2 cannot be applied to the wireless base station configured to include the access-side wireless interface and the backbone-side wireless interface, similarly to the case of document 1.

In addition, the prior-art Japanese Patent Application Laid-Open No. 2002-345016 (document 3) discloses a wireless channel allocation method that enables wireless channels to be allocated to each wireless link without variance in a mesh type wireless network.

However, a technique of document 3 is that even when each upper node autonomously and distributively sets the wireless channels allocated to a link of the upper node, different wireless channels are prevented from being allocated to the same link by a plurality of upper nodes.

Therefore, the technique of document 3 does not consider allocating wireless channels to the access-side wireless interface and the backbone-side wireless interface so that interference between the access-side wireless interface and the backbone-side wireless interface does not occur in the wireless base station including the access-side wireless interface and the backbone-side wireless interface.

In addition, there is a document that discloses a scan scheme of an active scan scheme or a passive scan scheme, or a technique of a spectrum or spectrum mask (see, for example, ISO/IEC 8802-11 IEEE Std 802.11 Second edition 2005-08-01 ISO/IEC 8802 11:2005(E) IEEE Std 802.11i-2003 Edition, Information technology—Telecommunications and information exchange between systems—Local and metropolitan area networks—Specific requirements Part 11: Wireless LAN Medium Access Control (MAC) and Physical Layer (PHY) specifications (Includes IEEE Std 802.11, 1999 Edition; IEEE Std 802.11a.-1999; IEEE Std 802.11b.-1999; IEEE Std 802.11b.-1999/Cor 1-2001; and IEEE Std 802.11d.-2001 (hereinafter referred to as Non-Patent Document 1)).

SUMMARY OF THE INVENTION

An exemplary feature of the invention is to provide a resource allocation apparatus, a central control apparatus, a wireless base station, a wireless communication system, a resource allocation method and a resource allocation program in a computer-readable medium capable of allocating resource information used in performing wireless communication so as not to generate interference between an access-side wireless interface and a backbone-side wireless interface, used for a wireless base station including the access-side wireless interface for covering wireless terminal devices and the backbone-side wireless interface for connecting wireless base stations with each other.

A resource allocation apparatus according to an exemplary aspect of the invention allocates resource information used in performing wireless communication to wireless base stations, wherein each of the wireless base stations includes an access-side wireless interface that covers wireless terminal devices and a backbone-side wireless interface that establishes communication between the wireless base stations, and the resource allocation apparatus includes a resource allocation unit that allocates resource information that is common to the wireless base stations to the backbone-side wireless interface that performs the wireless communication between the wireless base stations, and allocates resource information that does not generate interference with the backbone-side wireless interface to the access-side wireless interface.

A central control apparatus according to an exemplary aspect of the invention includes the resource allocation apparatus and a control unit that performs central control on the wireless base stations.

A wireless base station according to an exemplary aspect of the invention includes the resource allocation apparatus.

A wireless communication system according to an exemplary aspect of the invention includes wireless base stations and a resource allocation apparatus that allocates resource information used in performing wireless communication to the wireless base stations, wherein each of the wireless base stations includes an access-side wireless interface that covers wireless terminal devices and a backbone-side wireless interface that establishes communication between the wireless base stations, and the resource allocation apparatus includes a resource allocation unit that allocates resource information that is common to the wireless base stations to the backbone-side wireless interface that performs the wireless communication between the wireless base stations, and allocates resource information that does not generate interference with the backbone-side wireless interface to the access-side wireless interface.

A resource allocation method according to an exemplary aspect of the invention for a resource allocation apparatus that allocates resource information used in performing wireless communication to wireless base stations, wherein each of the wireless base stations includes an access-side wireless interface that covers wireless terminal devices and a backbone-side wireless interface that establishes communication between the wireless base stations, the method including resource allocation processes of allocating resource information that is common to the wireless base stations to the backbone-side wireless interface that performs the wireless communication between the wireless base stations and allocating resource information that does not generate interference with the backbone-side wireless interface to the access-side wireless interface.

A resource allocation method according to an exemplary aspect of the invention for a system that includes wireless base stations and a resource allocation apparatus that allocates resource information used in performing wireless communication to the wireless base stations, wherein each of the wireless base stations includes an access-side wireless interface that covers wireless terminal devices and a backbone-side wireless interface that establishes communication between the wireless base stations, the method including resource allocation processes of allocating resource information that is common to the wireless base stations to the backbone-side wireless interface which performs the wireless communication between the wireless base stations and allocating resource information that does not generate interference with the backbone-side wireless interface to the access-side wireless interface.

A resource allocation program in a computer-readable medium according to an exemplary aspect of the invention for a resource allocation apparatus which allocates resource information used in performing wireless communication to wireless base stations, wherein each of the wireless base stations includes an access-side wireless interface that covers wireless terminal devices and backbone-side wireless interface that establishes communication between the wireless base stations, the program causing a computer to perform resource allocation processes of allocating resource information that is common to wireless base stations to the backbone-side wireless interface that performs the wireless communication between wireless base stations and allocating resource information that does not generate interference with the backbone-side wireless interface to the access-side wireless interface.

BRIEF DESCRIPTION OF THE DRAWINGS

Exemplary features of the disclosed exemplary embodiments will be described by way of the following detailed description with reference to the accompanying drawings in which:

FIG. 6 is a diagram illustrating node information 410 of a storage unit 400 of a leader wireless base station A which constitutes the public wireless access system shown in FIG. 4, and illustrates a table configuration example in a state where the storage unit 400 of the wireless base station A stores the node information 410 on each wireless base station AP;

FIG. 10 is a view illustrating a sort result in a case where the node information 410 shown in FIG. 6 is sorted, in a predetermined order of priority;

FIG. 12 is a diagram illustrating node information 410 in a state where the group 1 is formed;

FIG. 14 is a diagram illustrating node information 410 in a state after the processes of the grouping in the step S100 of FIG. 8 are performed on the wireless base stations A to D which constitute the public wireless access system shown in FIG. 4;

FIG. 16 is a diagram illustrating virtual node information 420 when the virtual node generating process in the step S101 of FIG. 8 is performed on the wireless base stations A to D which constitute the public wireless access system shown in FIG. 4;

DESCRIPTION OF EXEMPLARY EMBODIMENTS

First, an outline of a wireless communication system according to an exemplary embodiment will be described.

Figure 1:
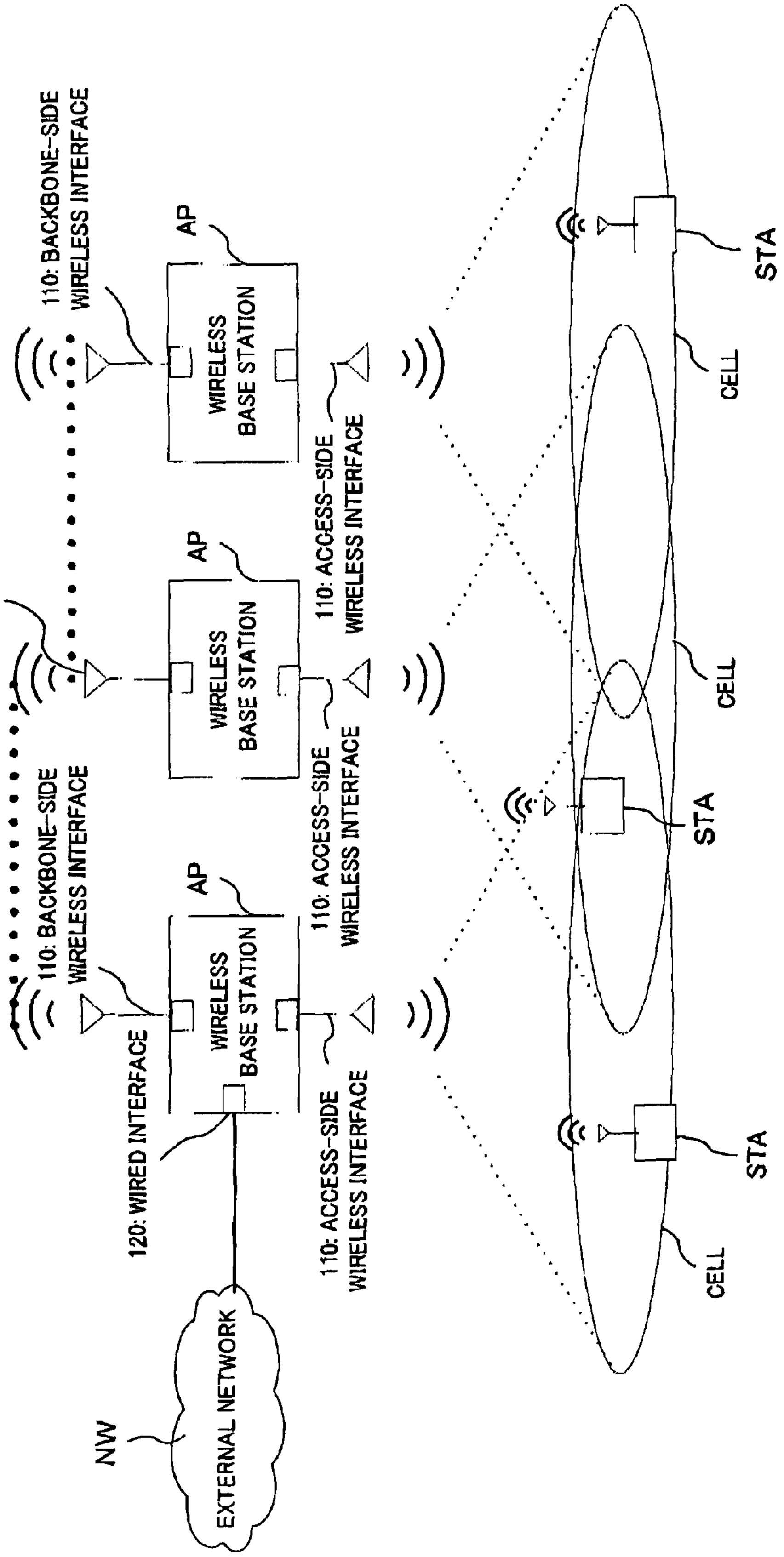
FIG. 1 is a diagram illustrating a system configuration of a wireless communication system.

The wireless communication system is, as shown in FIG. 1, a wireless communication system including a plurality of wireless base stations APs.

A wireless base station AP includes an access-side wireless interface 110 that covers wireless terminal devices STAs, and a backbone-side wireless interface 110 that establishes communication between wireless base stations APs.

A leader (master) wireless base station AP for managing and controlling each wireless base station AP allocates resource information used in performing wireless communication to each wireless base station AP. The leader wireless base station AP allocates resource information that is common to the wireless base stations APs to the backbone-side wireless interfaces 110 that perform wireless communication between the wireless base stations APs, and allocates resource information that does not generate interference with the backbone-side wireless interfaces 110 to the access-side wireless interfaces 110.

Accordingly, for the plurality of wireless base stations APs including the access-side wireless interfaces 110 for covering the wireless terminal devices STAs and the backbone-side wireless interfaces 110 for connecting the wireless base stations APs with each other, the leader wireless base station AP allocates resource information used in performing wireless communication so that interference does not occur between the access-side wireless interfaces 110 and the backbone-side wireless interfaces 110.

Figure 26:
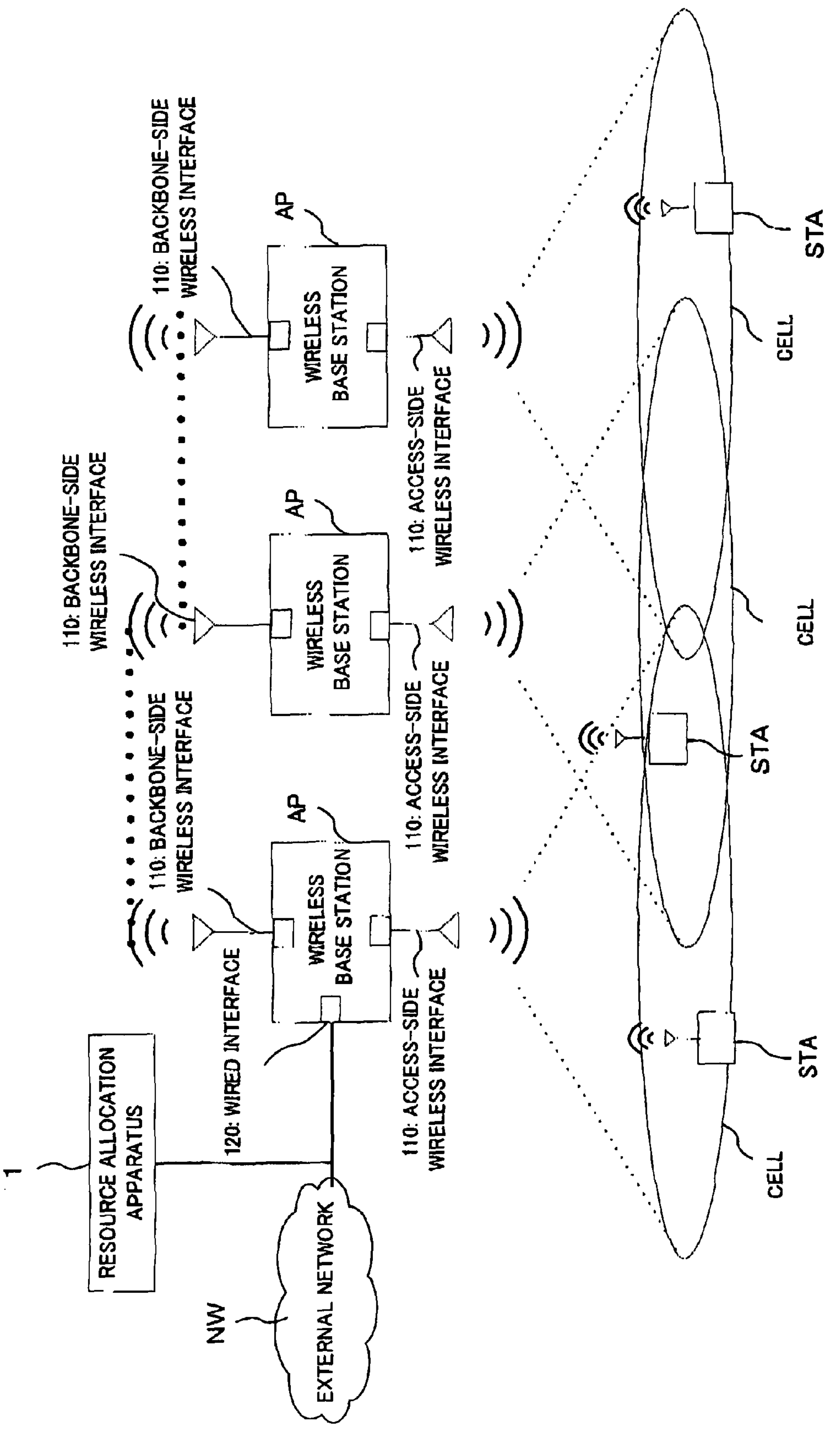
FIG. 26 is a diagram illustrating a system configuration of a wireless communication system according to a third exemplary embodiment.

In addition, a wireless communication system according to an embodiment, as shown in FIG. 26, is a wireless communication system including a plurality of wireless base stations APs and a resource allocation apparatus 1 for allocating resource information used in performing wireless communication to the wireless base stations APs.

The wireless base station AP includes an access-side wireless interface 110 for covering wireless terminal devices STAs, and a backbone-side wireless interface 110 for connecting wireless base stations AP with each other.

The resource allocation apparatus 1 allocates resource information that is common to the wireless base stations APs to the backbone-side wireless interfaces 110 which perform wireless communication between the wireless base stations APs and allocates resource information that does not generate interference with the backbone-side wireless interfaces 110 to the access-side wireless interfaces 110.

Accordingly, for the wireless base stations APs including the access-side wireless interfaces 110 for covering the wireless terminal devices STAs and the backbone-side wireless interfaces 110 for connecting the wireless base stations APs with each other, the resource allocation apparatus 1 can allocate the resource information used in performing wireless communication so that interference does not occur between the access-side wireless interfaces 110 and the backbone-side wireless interfaces 110.

Hereinafter, the wireless communication system will be described in detail with reference to the attached drawings.

First Exemplary Embodiment

<System Configuration of Wireless Communication System>

First, with reference to FIG. 1, a system configuration of the wireless communication system will be described.

The wireless communication system includes a plurality of wireless terminal devices STAs and a plurality of wireless base stations APs.

The wireless base station AP that constitutes the wireless communication system includes a wired interface 120 for connecting with an external network NW and wireless interfaces 110 for connecting with the wireless base stations APs or the wireless terminal devices STAs.

As the wireless interface 110, there are an access-side wireless interface 110 for covering the wireless terminal devices STAs and a backbone-side wireless interface 110 used to access the wireless base stations APs.

<Internal Configuration of Wireless Base Station AP>

Next, an internal configuration of the wireless base station AP which constitutes the wireless communication system will be described with reference to FIG. 2.

Figure 2:
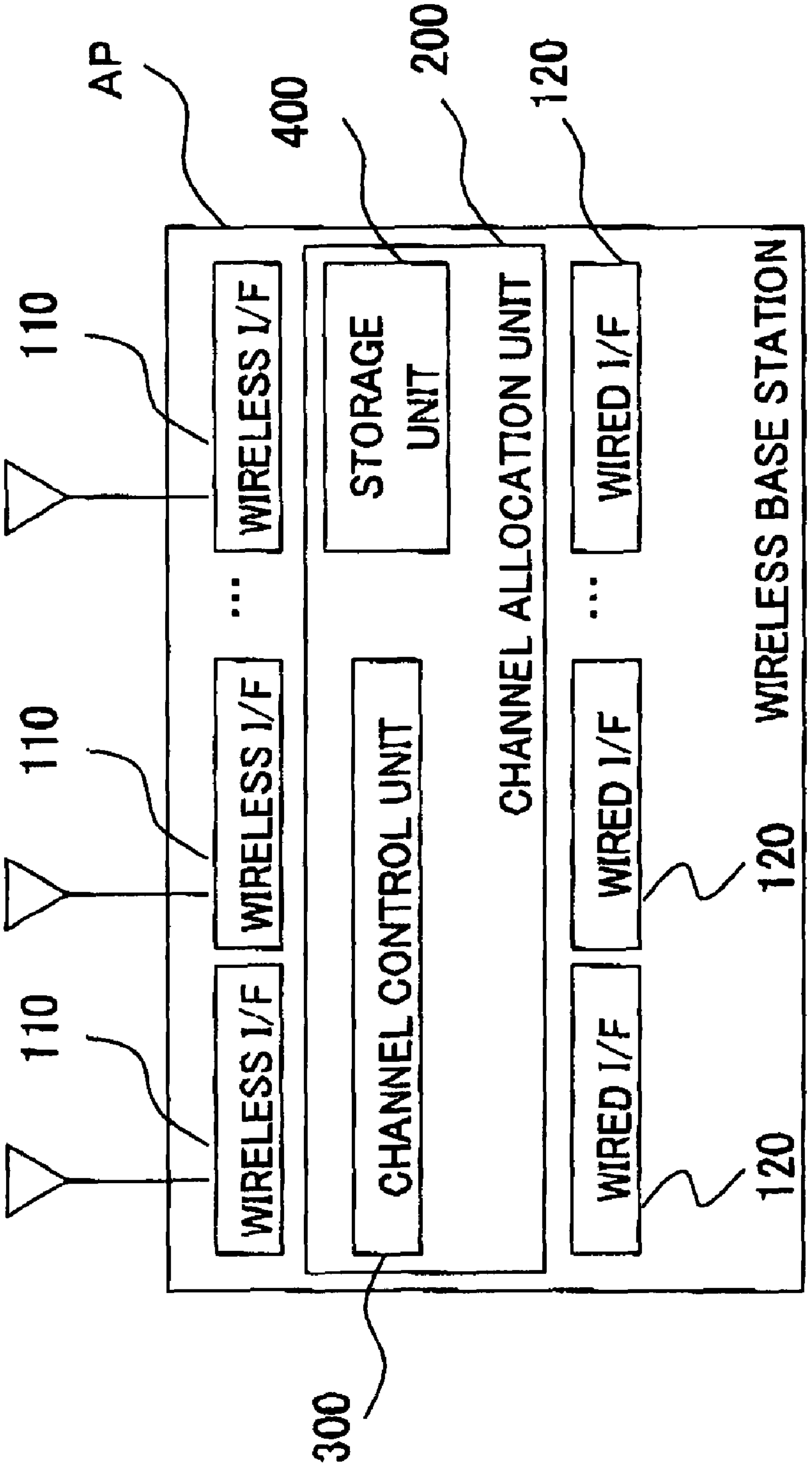
FIG. 2 is a diagram illustrating an internal configuration of a wireless base station AP which constitutes the wireless communication system of the present invention.

The wireless base station AP, as shown in FIG. 2, includes wireless interfaces 110, wired interfaces 120, and a channel allocation unit 200. The wireless interface 110 is an interface for performing wireless communication.

The wireless base station AP includes one or more wireless interfaces 110.

The wireless interface 110 may be applied with wireless interfaces having the same wireless specification (signal strength, directivity, and the like), or wireless interfaces having different wireless specifications.

The wired interface 120 is an interface for performing wired communication.

In the wireless base station AP, as shown in FIG. 1, the wireless base station AP that is connected to the external network NW may have the wired interface 120, while the wireless base station AP that is not connected to the external network NW does not need to have the wired interface 120. The number of the wired interfaces 120 mounted on the wireless base station AP is not specifically limited.

The channel allocation unit 200 is designed to allocate wireless channels.

The channel allocation unit 200 includes a channel control unit 300 and a storage unit 400.

The channel control unit 300 is designed to allocate a wireless channel proper for the wireless interface 100 on the basis of information stored in the storage unit 400.

The storage unit 400 is designed to store information used in allocating a wireless channel to a wireless interface 110.

Figure 3:
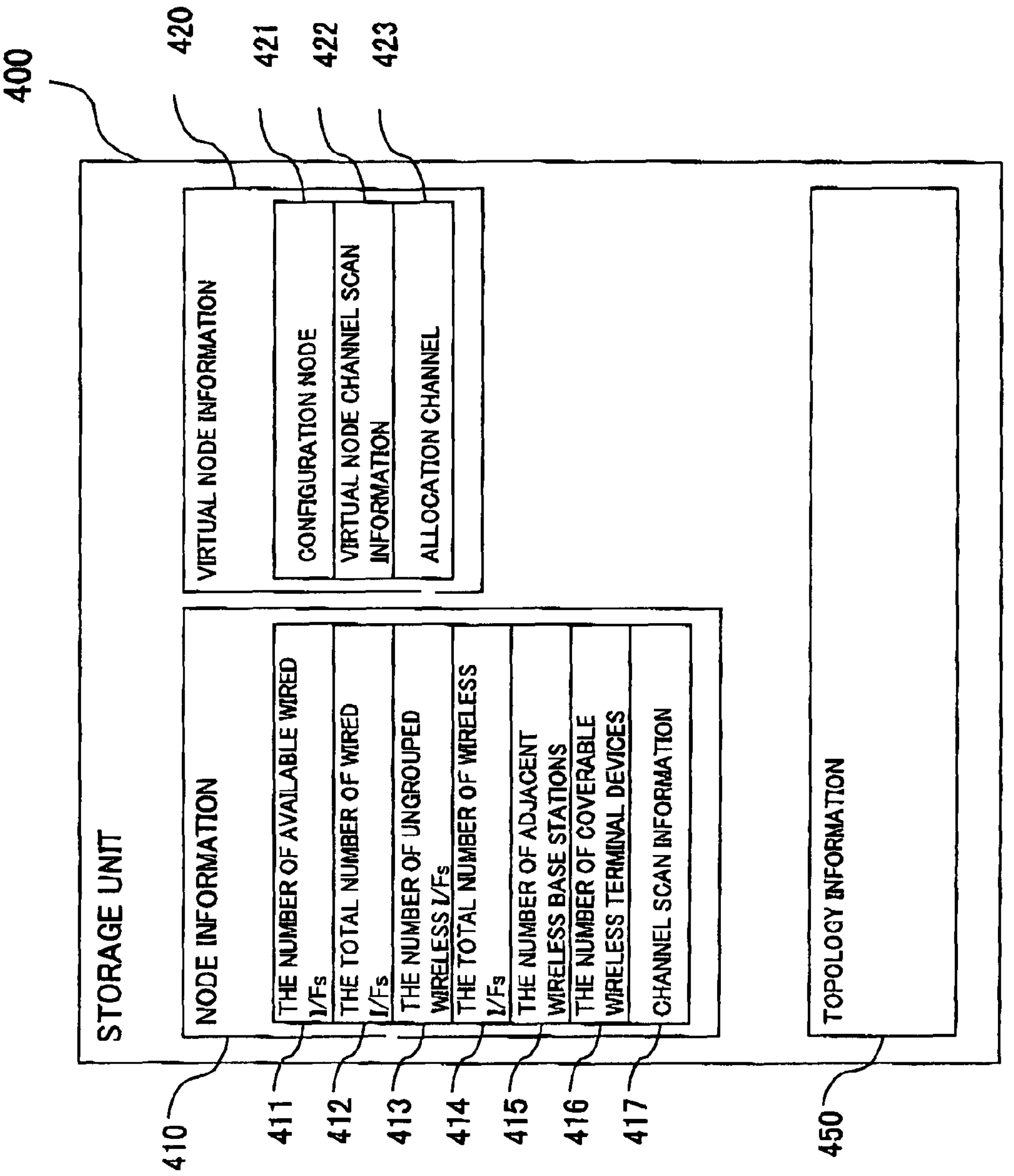
FIG. 3 is a diagram illustrating an internal configuration of a storage unit 400 of the wireless base station AP which constitutes the wireless communication system of the present invention.

The storage unit 400, as shown in FIG. 3, stores node information 410, topology information 450, and virtual node information 420.

The node information 410 is information on the wireless base station AP, and as shown in FIG. 3, may include the number 411 of available wired interfaces, the total number 412 of wired interfaces, the number 413 of ungrouped wireless interfaces, the total number 414 of wireless interfaces, the number 415 of adjacent wireless base stations, the number 416 of coverable wireless terminal devices, and channel scan information 417.

Each of the information 411 to 417 will be described in detail.

The topology information 460 is information on a connection state of each wireless base station AP.

Accordingly, it can be perceived to which wireless base station AP each wireless base station AP is connected.

In addition, the topology information 450 is generated, for example, by exchanging the node information 410 between each wireless base station AP and adjacent wireless base stations APs.

The virtual node information 420 is information on each group that performs wireless channel allocation.

According to this exemplary embodiment, in order to assume that a single group is virtually a single node, it is called the "virtual node information."

The virtual node information 420 may include a configuration node 421, virtual node channel scan information 422, and an allocation channel 423.

The configuration node 421 is information representing a wireless base station AP that constitutes each virtual node, that is, each group.

The virtual node channel information 422 is information obtained from channel scan information 417 on the wireless base station AP that constitutes each virtual node, that is, each groups and is information representing a usage state of wireless channels of the group or around the group.

According to the exemplary embodiment, the virtual node channel scan information 422 may include information representing the usage state of wireless channels around the group.

Therefore, by using the information representing the usage state of the wireless channels around the group, it is possible to perform wireless channel allocation so as not to generate interference with another system.

The allocation channel 423 is information representing a wireless channel allocated to the virtual node, that is, the group.

<Public Wireless Access System>

Next, a case where the public wireless access system is configured by connecting a plurality of the wireless base stations APs shown in FIG. 2 will be described with reference to FIG. 4

In a case where the public wireless access system is configured, first, wireless base stations APs shown in FIG. 2 are arbitrarily connected to configure a mesh network.

Thereafter, wireless terminal devices STAs that exist in a wave coverage range of each wireless base station AP belong to the wireless base station AP to configure the public wireless access system.

Figure 4:
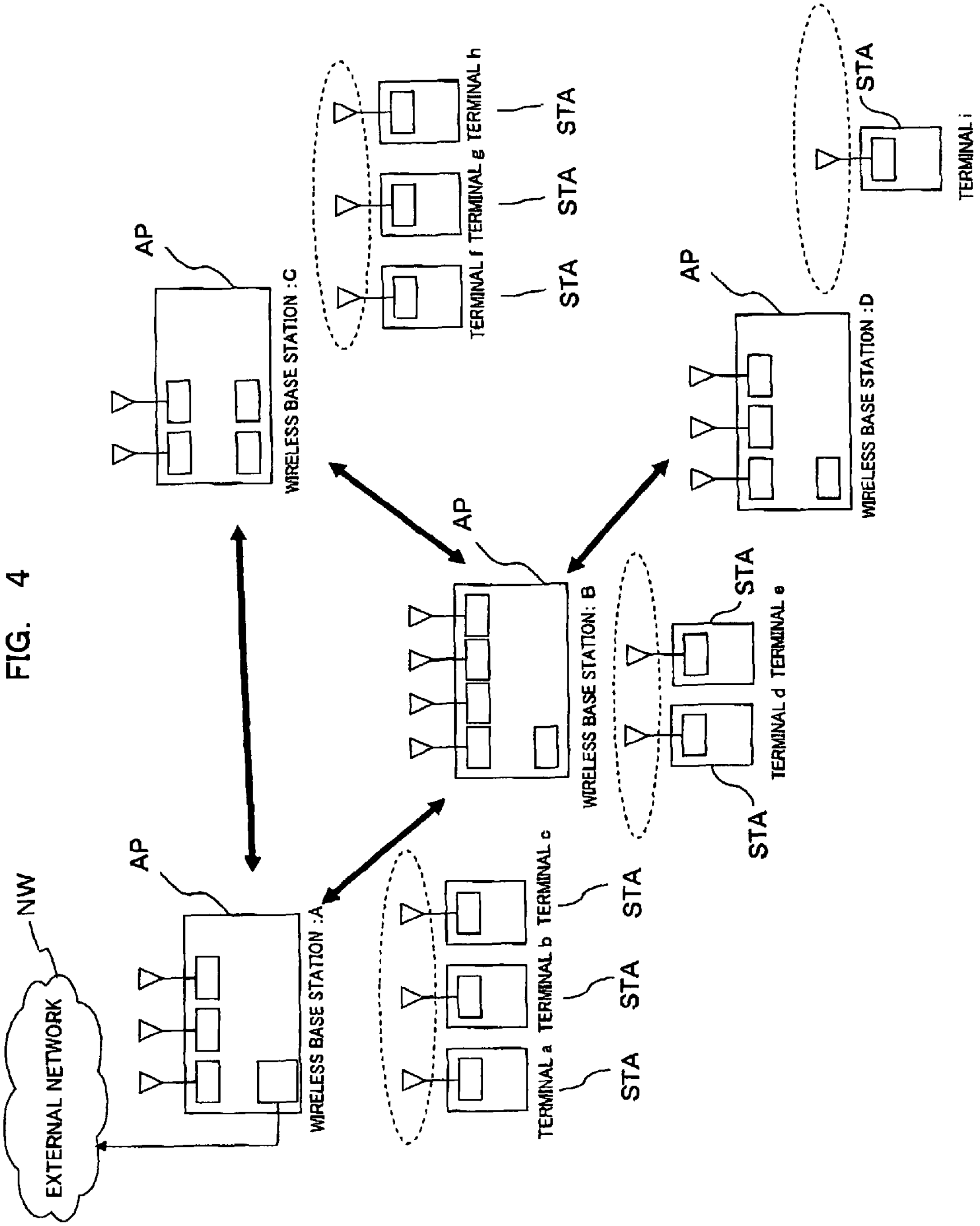
FIG. 4 is a diagram illustrating a system configuration of a public wireless access system configured by connecting a plurality of wireless base stations APs which constitute the wireless communication system of the present invention.

A wireless base station A which constitutes the public wireless access system shown in FIG. 4 connects to an external network NW such as the Internet by using a wired interface 120.

Accordingly, the wireless terminal devices STAs that constitute the public wireless access system shown in FIG. 4 connect to the external network NW via the wireless base station A.

It is assumed that in the public wireless access system shown in FIG. 4, the wireless base station A, a wireless base station B, and a wireless base station C can communicate with one another.

It is assumed that a wireless base station D can communicate with the wireless base station B.

It is also assumed that wireless terminal devices a, b, and c are covered by the wireless base station A.

Further, it is assumed that wireless terminal devices d and e are covered by the wireless base station B.

Furthermore, it is assumed that wireless terminal devices f, g, and h are covered by the wireless base station C.

In addition, it is assumed that a wireless terminal device i, is covered by the wireless base station D.

<A Series of Control Processes in the Wireless Communication System>

Next, a series of control processes performed in the wireless communication system will be described by using the public wireless access system shown in FIG. 4.

First, each wireless base station AP generates its own node information 410.

The number 411 of available wired interfaces is 1 in a case where the wired interface 120 is connected to the external network NW to enable communication, and the number of communicable wired interfaces is stored in the storage unit 400.

Since in the system configuration shown in FIG. 4, the wireless base station A is connected to the external network NW, the number 411 of available wired interfaces of the wireless base station A is 1.

The total number 412 of wired interfaces mounted on the wireless base station AP is stored in the storage unit 400.

In the system configuration shown in FIG. 4, the total number of wired interfaces of the wireless base stations A, B, and D is 1.

In addition, the total number of wired interfaces of the wireless base station C is 2.

As the number 413 of ungrouped wireless interfaces, the number of wireless interfaces to which a wireless channel is not allocated (each of which does not belong to a group) is stored in the storage unit 400.

Initially, a wireless channel is not allocated (in a state of default), the number 413 of ungrouped wireless interfaces is the same as the total number of the wireless interfaces mounted on the wireless base station AP.

In the system configuration shown in FIG. 4, the numbers of ungrouped wireless interfaces of the wireless base stations A and D are 3 in the state of default.

The number of ungrouped wireless interfaces of the wireless base station B is 4.

In addition, the number of ungrouped wireless interfaces of the wireless base station C is 2.

As the total number 414 of wireless interfaces, the total number of the wireless interfaces 110 mounted on the wireless base station AP is stored in the storage unit 400.

In the system configuration shown in FIG. 4, the numbers of ungrouped wireless interfaces of the wireless base stations A and D are 3.

The number of ungrouped wireless interfaces of the wireless base station B is 4.

The number of ungrouped wireless interfaces of the wireless base station C is 2.

Each wireless base station AP performs a scan process on a wireless state adjacent to itself to acquire the number 415 of adjacent wireless base stations adjacent to the wireless base station AP itself, the number 416 of coverable wireless terminal devices that are covered by the wireless base station AP itself, wireless channel information, and the like, and the acquired information is stored in the storage unit 400.

In the system configuration shown in FIG. 4, the number of adjacent wireless base stations to the wireless base station A is 2.

The number of adjacent wireless base stations to the wireless base station B is 3.

The number of adjacent wireless base stations to the wireless base station C is 2.

The number of adjacent wireless base stations to the wireless base station D is 1.

The number of coverable wireless terminal devices of the wireless base station A is 3.

The number of coverable wireless terminal devices of the wireless base station B is 2.

The number of coverable wireless terminal devices of the wireless base station C is 3.

The number of coverable wireless terminal devices of the wireless base station D is 1.

The channel scan information 417 is used to manage a received signal strength of each wireless channel that is available by the wireless base station AP.

According to this exemplary embodiment, when a received signal strength prediction function fn(x) is used, channel scan information S(x) of a wireless channel x is calculated by using the following Equation 1:

$$s(x) = \sum_{n=1}^{N} \int_{fs(x)}^{fe(x)} f_n(n) \quad \text{[Equation 1]}$$

where, fs(x) denotes a start frequency in a frequency distribution of the wireless channel x; fe(x) denotes an end frequency in the frequency distribution of the wireless channel x; fn(x) denotes the received signal strength prediction function; and N denotes the total number of received signal strengths.

For example, a function obtained from a diffuse spectrum in the frequency distribution or the like can be applied as the received signal strength prediction function fn(x). A function in consideration of a wave attenuation rate or the like can be also applied.

Figure 5:
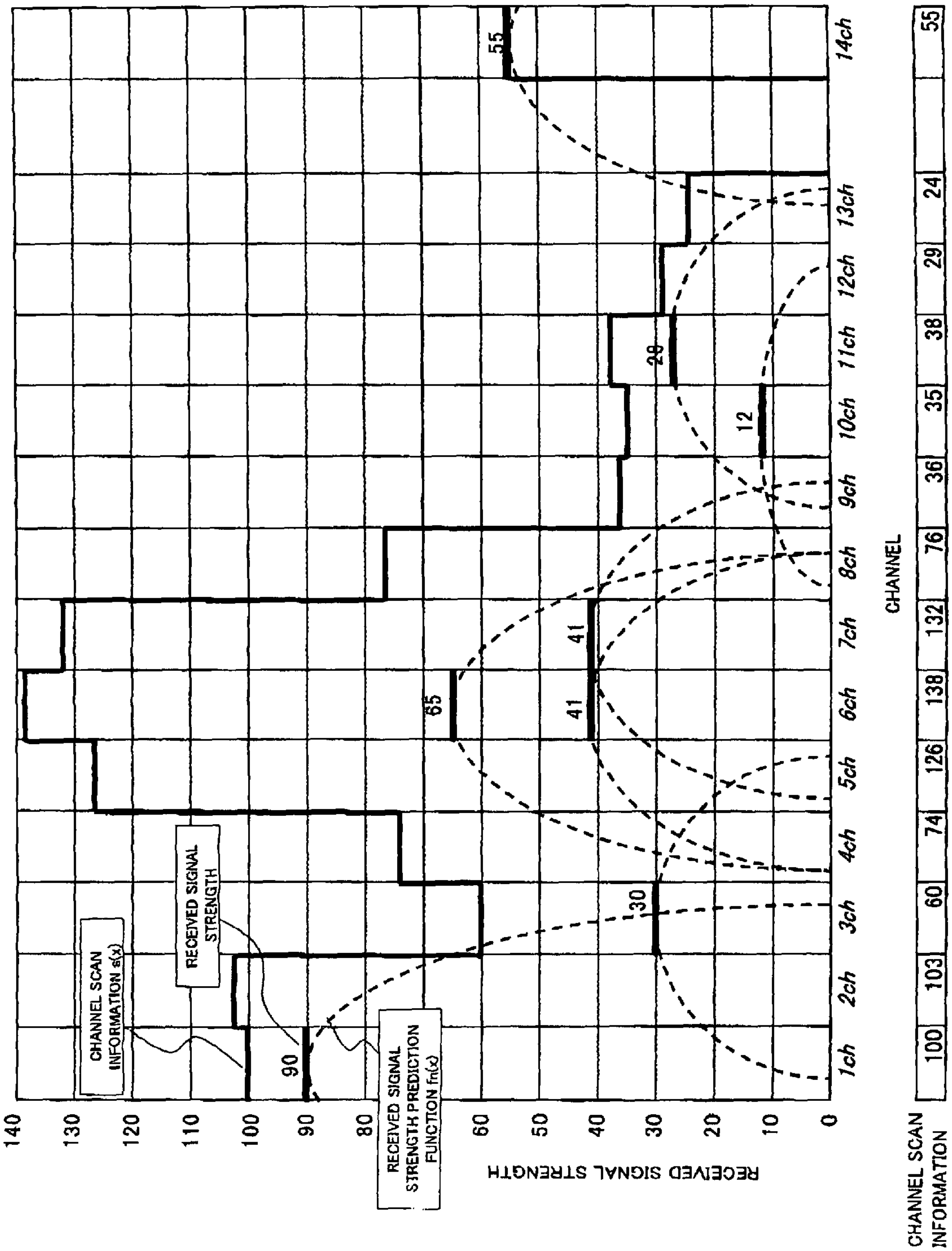
FIG. 5 is a diagram illustrating an example of measurement results in a case where each wireless base station AP performs a channel scan process to measure wireless channel information (received signal strength) on each wireless channel.

FIG. 5 illustrates an example of measurement results in a case where the channel scan process is performed to measure wireless channel information (received signal strength) on each wireless channel.

The measurement results shown in FIG. 5, represent a state where wireless channel information (received signal strength) is measured for each of wireless channels x (=1 to 14).

The measurement results shown in FIG. 5 show that there exists a wireless apparatus that uses a wireless channel 1ch and a received signal strength thereof is 90.

Similarly, it is represented that there exists a wireless apparatus that uses a wireless channel 3ch and a received signal strength thereof is 30.

It is represented that there exist two wireless apparatuses that use a wireless channel 6ch and received signal strengths thereof are 65 and 41.

It is also represented that there exists a wireless apparatus that uses a wireless channel 7ch and a received signal strength thereof is 41.

Further, it is represented that there exists a wireless apparatus that uses a wireless channel 10ch and a received signal strength thereof is 12.

Furthermore, it is represented that there exists a wireless apparatus that uses a wireless channel 11ch and a received signal strength thereof is 28.

In addition, it is represented that there exists a wireless apparatus that uses a wireless channel 14ch and a received signal strength thereof is 55.

The wireless channel information (received signal strength) is measured by applying a well-known channel scan scheme.

For example, the wireless channel information (received signal strength) can be measured by applying a scan scheme disclosed in Non-Patent Document 1. An active scan scheme or a passive scan scheme is applied.

The active scan scheme retrieves a network by exchanging a probe request/response frame.

The passive scan scheme searches through a network by monitoring beacons.

As described above, it is possible to apply a well-known scan scheme and acquire wireless channel information (received signal strength) on each wireless channel.

A dotted line shown in FIG. 6 represents a calculation result of the received signal strength prediction function fn(x) in the aforementioned Equation 1. For example, it is represented that when the wireless channel 1ch is used, the wave interference also occurs to the extent of the wireless channels 2ch and 3ch.

According to this exemplary embodiment, the received signal strength prediction function fn(x) is calculated based on the received signal strength acquired by applying the aforementioned scan scheme, so that an interference region where wave interference occurs is predicted.

Accordingly, without mounting a specific interference detection apparatus, it is possible to predict an interference region where wave interference occurs.

Although values of the received signal strength are applied in FIG. 5, logarithmic values thereof may be applied.

According to this exemplary embodiment, the channel scan information S(x) of each wireless channel shown in FIG. 5 is calculated by using the received signal strength of each wireless channel and the received signal strength prediction function fn(x) of the aforementioned Equation 1. The calculated channel scan information S(x) is stored in the storage unit 400.

This enables management of the channel scan information 417 by the storage unit 400.

The channel scan information 417 is measured for each wireless channel, and in a case of the measurement results shown in FIG. 5, channel scan information 417 from 1ch to 14ch are managed by the storage unit 400.

Each wireless base station AP transmits its own node information 410 to the leader (master) wireless base station A.

Accordingly, the leader wireless base station A acquires the node information 417 on each wireless base station AP, and the wireless base station A stores the node information 410 acquired from each wireless base station AP in the storage unit 400 of the wireless base station A.

FIG. 6 illustrates a table configuration in a state where the node information 410 on each wireless base station AP is stored in the storage unit 400 of the wireless base station A.

In the table configuration shown in FIG. 6, the node information 410 of each wireless base station AP is managed in a relationship between NUMBER and NAME. The NUMBER represents a serial number, and the NAME represents a name of each wireless base station AP.

According to this exemplary embodiment, a determination method of determining a leader wireless base station AP is not particularly limited, but any determination method may be applied that determines a single wireless base station AP that exists in a network as a leader.

For example, the leader wireless base station AP may be determined by applying various conditions such as a wireless base station AP having the smallest MAC address of a network interface, or a wireless base station AP connected to the external network NW.

In addition, according to this exemplary embodiment, as shown in FIG. 6, the node information 410 on each wireless base station AP is managed in a relationship between the NUMBER and the NAME. However, the NUMBER and the NAME are only an example. When the node information 410 on each wireless base station AP can be identified, the node information 410 on each wireless base station AP can be managed in relation to all of identification information.

The leader wireless base station A acquires the node information 410 from all the wireless base stations A to D which constitute the public wireless access system (wireless mesh network) and generates the node information 410 shown in FIG. 6.

Thereafter, the topology information 450 is generated based on the node information 410 shown in FIG. 6.

According to the embodiment, the wireless base stations APs exchange information with one another and transmit the node information 410 to the leader wireless base station A, so that the leader wireless base station A can acquire the node information 410 of all the wireless base stations A to D which constitute the public wireless access system.

Accordingly, the leader wireless base station A manages the node information 410 shown in FIG. 6, and generates the topology information 450.

Figure 7:
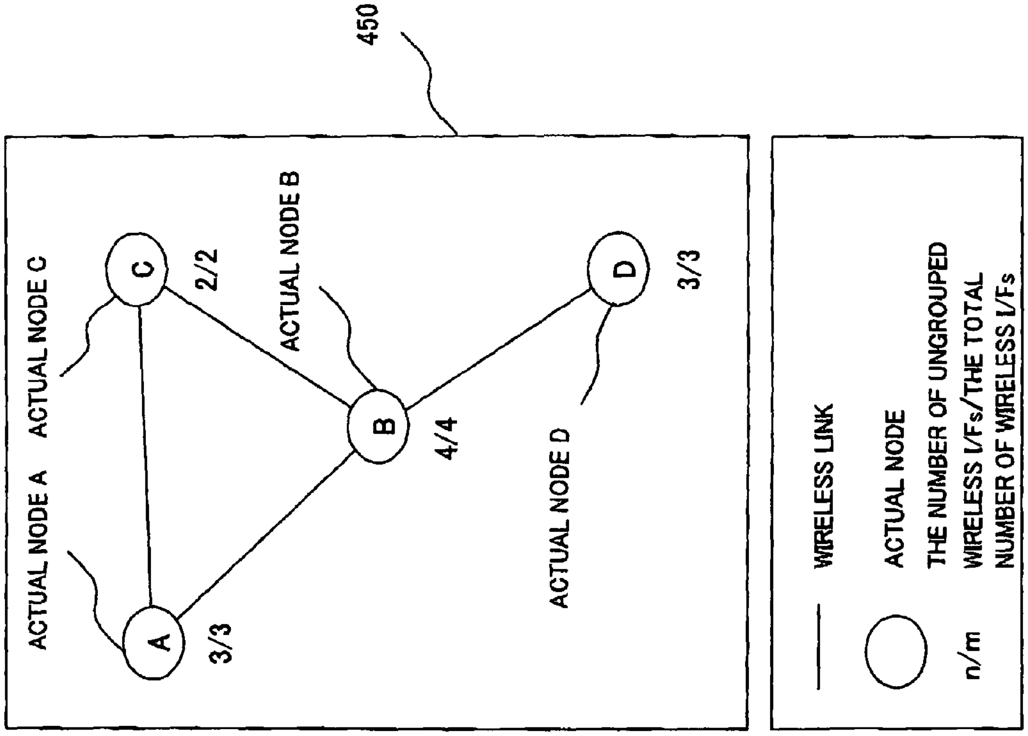
FIG. 7 illustrates an image diagram of topology diagram 450 generated by the leader wireless base station A.

FIG. 7 illustrates an image diagram of the topology information 450 generated by the leader wireless base station A.

In the image diagram shown in FIG. 7, actual nodes connected by solid lines with each other represent wireless base stations that are actually communicating with each other.

In FIG. 7, actual nodes A, B, and C are mutually connected in solid line (wireless link), and an actual node D is connected to only the actual node B in solid line (wireless link).

More specifically, the image diagram shown in FIG. 7 represents the system configuration of the public wireless access system shown in FIG. 4, and shows a state where the wireless base stations A, B, and C communicate with one another while the wireless base station D communicates with the wireless base station B.

In the image diagram shown in FIG. 7, n/m denotes a ratio of the number 413 of ungrouped wireless interface(s) of each of the wireless base stations A to D to the total number 414 of wireless interfaces, n denotes the number 413 of ungrouped wireless interface(s), and m denotes the total number 414 of wireless interfaces.

Next, a series of processes performed to determine a wireless channel by the leader wireless base station A will be described with reference to FIG. 8.

First, a channel control unit 300 performs grouping on the wireless base stations A to D that constitute the public wireless access system shown in FIG. 4 on the basis of the node information 410 and the topology information 450 stored in the storage unit 400 (step S100).

This allows the wireless base stations A to D that constitute the public wireless access system to be grouped into a plurality of groups.

Figure 13:
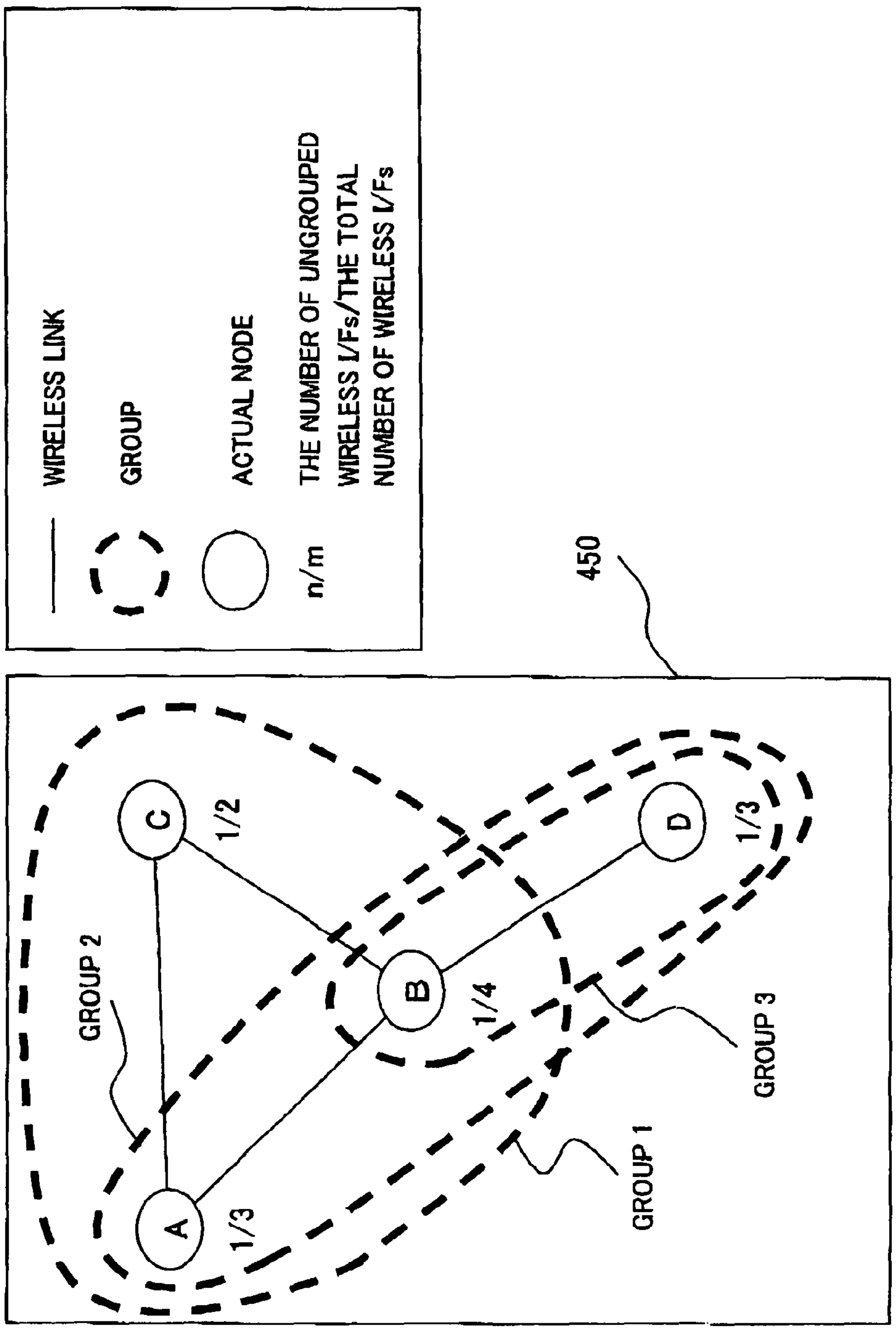
FIG. 13 illustrates an image diagram of topology information 450 in a state after processes of the grouping in the step S100 of FIG. 8 are performed on the wireless base stations A to D which constitute the public wireless access system shown in FIG. 4.

FIG. 13 illustrates a state where grouping is performed on the wireless base stations A to D which constitute the public wireless access system shown in FIG. 4.

Next, a virtual node generating process is performed on the groups of the step S100 (step S101).

Accordingly, each group is assumed to be a single virtual node.

FIG. 7 illustrates a state where the virtual node generating process is performed on each group shown in FIG. 13.

Next, for the virtual nodes on which the virtual node generating process in the step S101 is performed, different wireless channels are allocated so as not to generate interference between virtual nodes, and an actual node generating process is performed.

Accordingly, different wireless channels are allocated to groups in order not to generate interference between the groups.

The aforementioned process enables channel allocation to be performed to the backbone-side wireless interfaces 110 of each of the wireless base stations A to D that constitute each group (S102).

Figure 20:
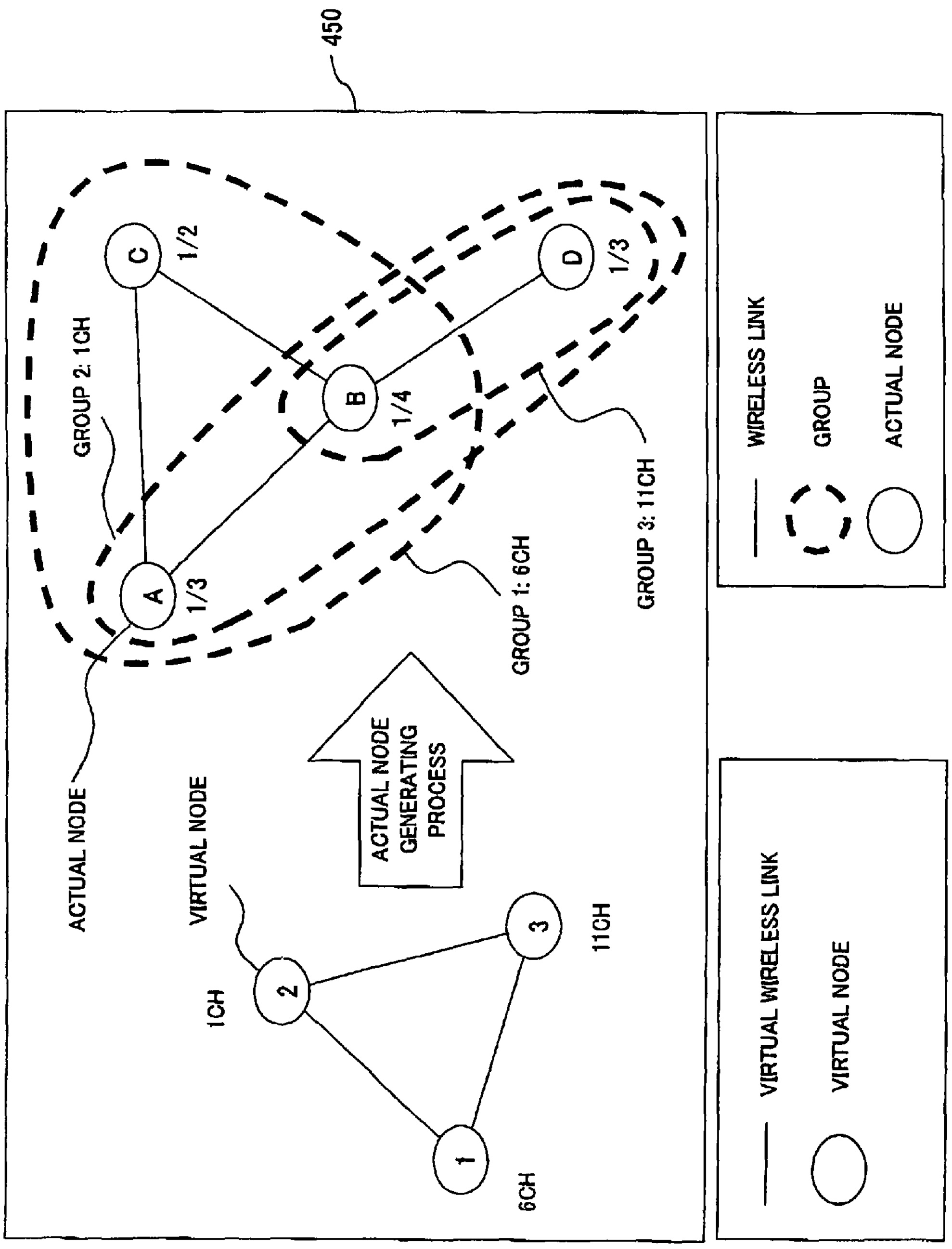
FIG. 20 is a diagram illustrating a state where wireless channel allocation to the backbone-side wireless interface 110 of the wireless base station AP is completed.

FIG. 20 illustrates a state where channel allocation to the backbone-side wireless interface 110 is performed.

Next, channel allocation to the access-side wireless interfaces 110 is performed on the wireless base stations A to D on which channel allocation to the backbone-side wireless interfaces 110 is performed in the step S102 so as not to generate interference with the wireless channels allocated to the backbone-side wireless interfaces 110 (S103).

Figure 22:
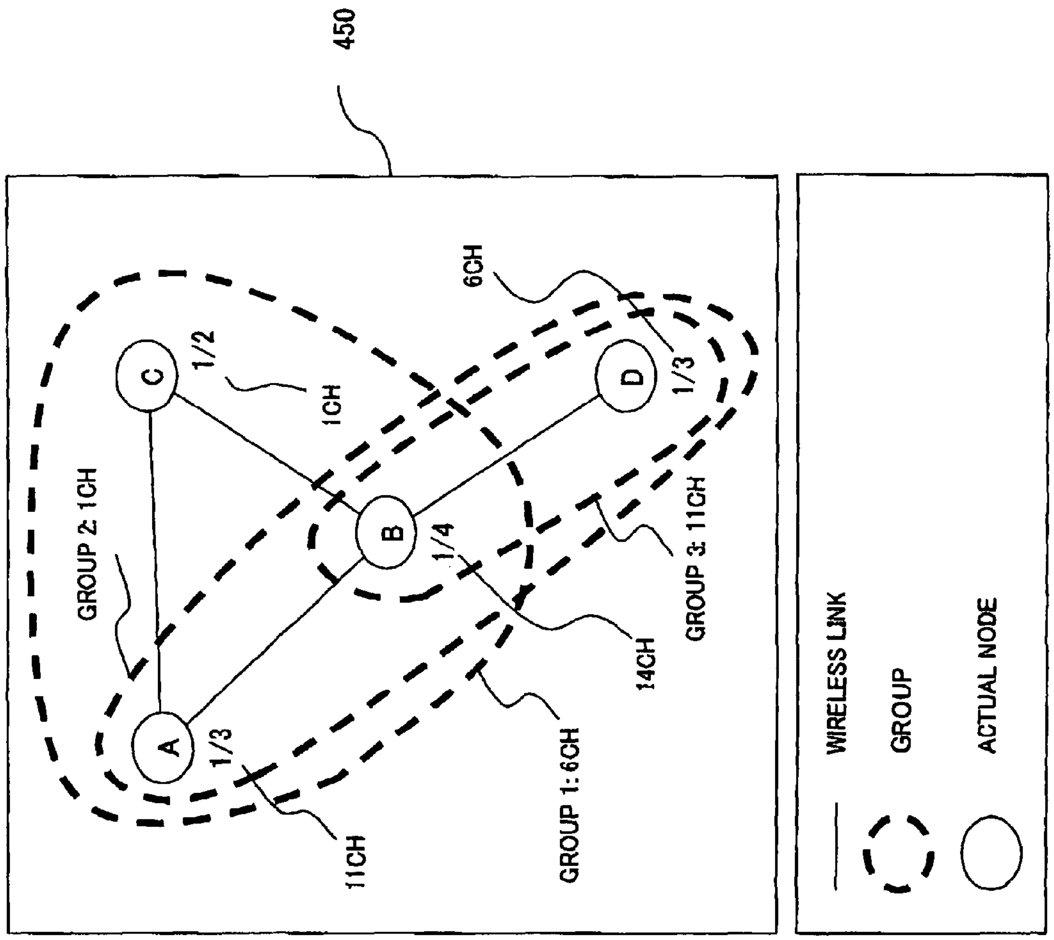
FIG. 22 is a diagram illustrating a state where wireless channel allocation to the access-side wireless interface 110 of the wireless base station AP is completed.

FIG. 22 illustrates a state where channel allocation to the access-side wireless interfaces 110 is performed.

Next, it is determined whether a feedback process is needed (S104). When it is determined that the feedback process is needed (step S104/Yes), the process proceeds to the step S100 to execute processes of the aforementioned steps S100 to S103.

On the other hand, when it is determined that the feedback process is not needed (step S104/No), the process is terminated.

The method of determining whether the feedback process is needed is made as follows. When it is determined that interference between the wireless channel allocated to the backbone-side wireless interface 110 and the wireless channel allocated to the access-side wireless interface 110 occurs, it is determined that the feedback process is needed. When it is determined that interference does not occur, it is determined that the feedback process is not needed.

Determining whether the feedback process is to be performed makes it possible to perform proper channel allocation to the entire wireless mesh network that constitutes the public wireless access system.

Figure 23:
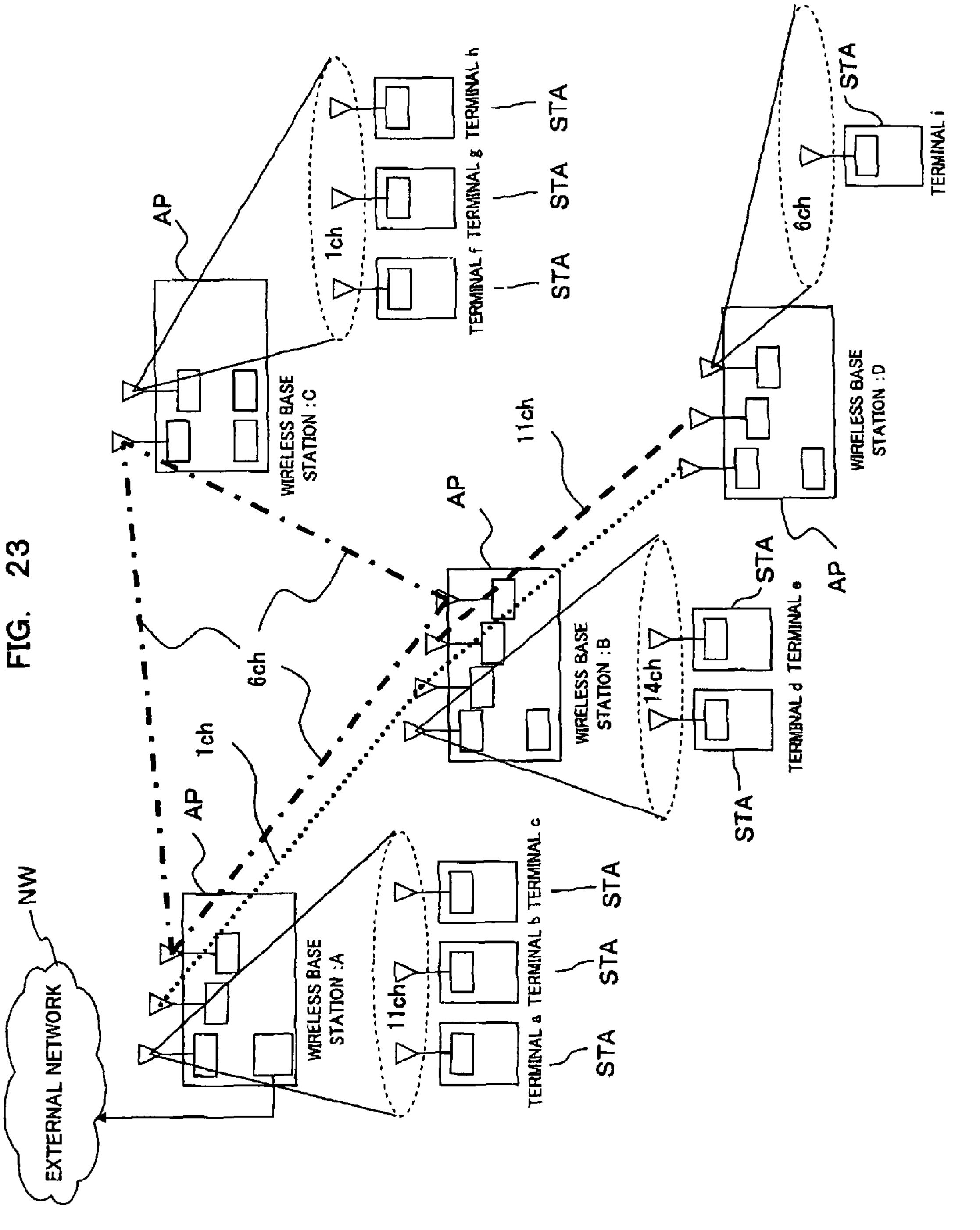
FIG. 23 is a diagram illustrating a state where a series of processes shown in FIG. 8 are completed, and a wireless channel is allocated to each wireless base station AP that constitutes the public wireless access system shown in FIG. 4.

FIG. 23 illustrates a state where wireless channels are allocated to the backbone-side wireless interfaces 110 and the access-side wireless interfaces 110 included in each of the wireless base stations A to D which constitute the public wireless access system.

Figure 8:
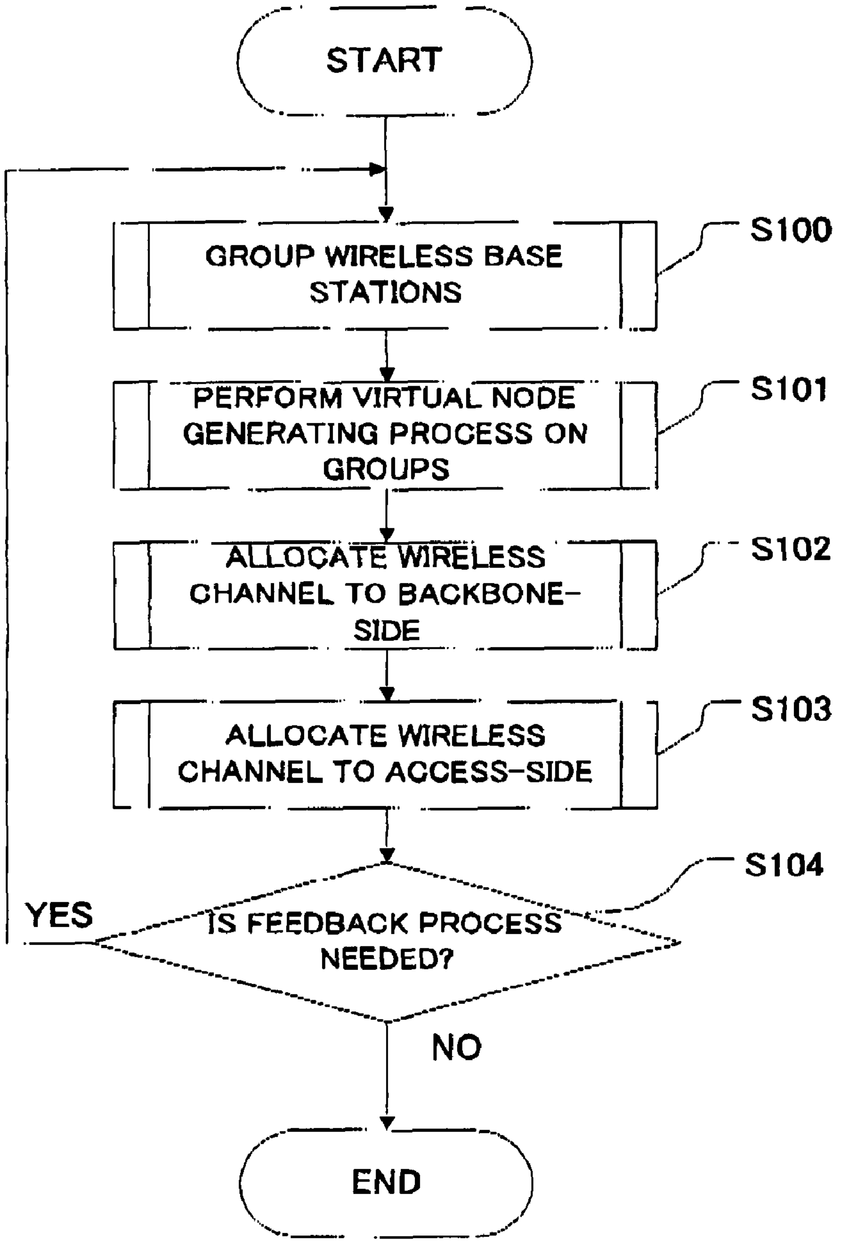
FIG. 8 is a schematic flowchart illustrating a series of processes performed when a wireless channel is determined for the leader wireless base station A.

As described above, the leader (master) wireless base station A performs a series of processes shown in FIG. 8, so that for the wireless base stations A to D including the access-side wireless interfaces 110 and the backbone-side wireless interfaces 110, the leader wireless base station A can allocate a wireless channel that is common to the wireless base stations to the backbone-side wireless interfaces 110 which perform wireless communication between the wireless base stations, and allocate wireless channels which do not generate interference between the access-side wireless interfaces 110 and the backbone-side wireless interfaces 110 to the access-side wireless interfaces 110.

In addition, details of each step shown in FIG. 8 will now be described.

<Grouping process in Step S100 of FIG. 8>

Figure 9:
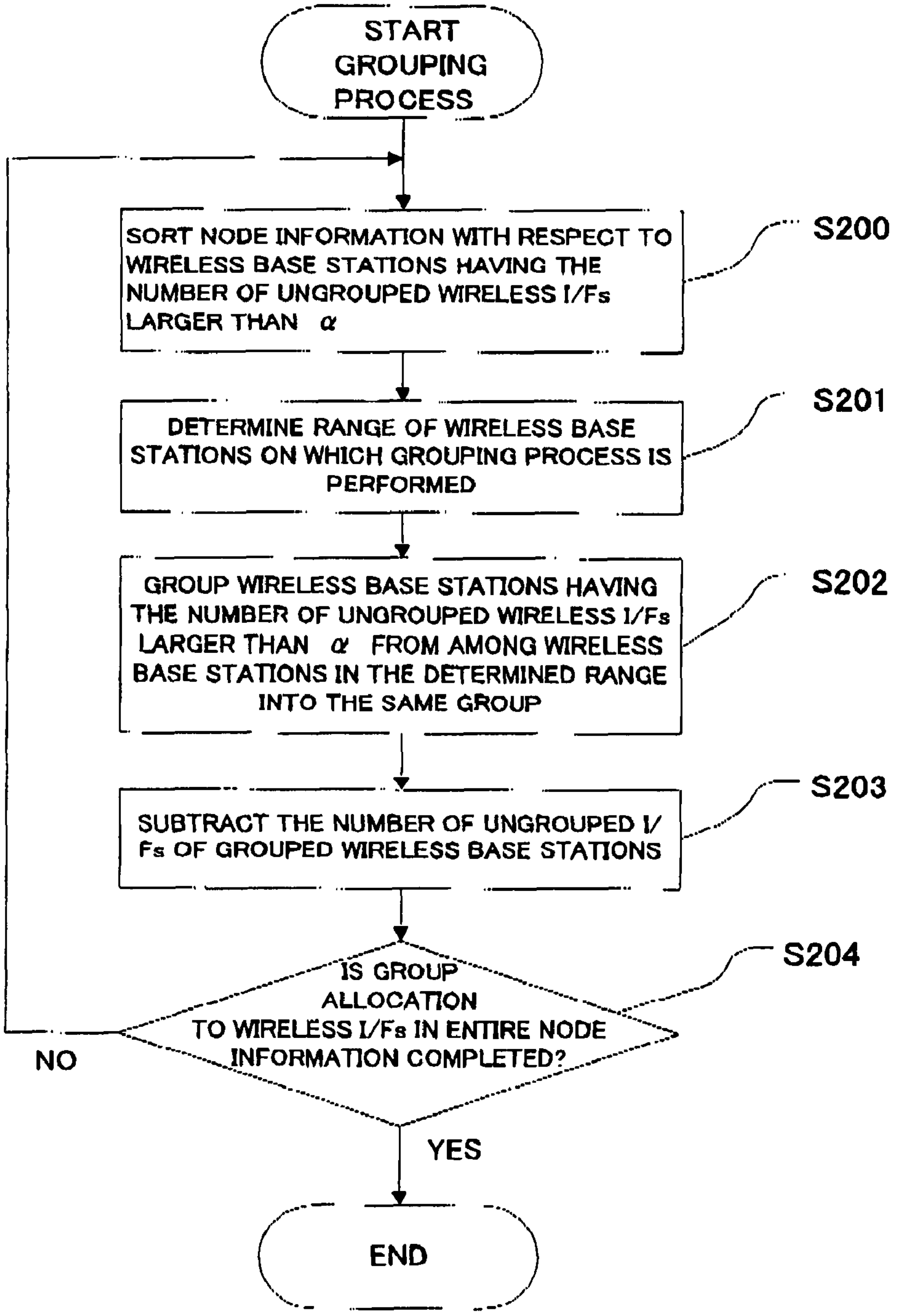
FIG. 9 is a flowchart illustrating detailed processes performed when grouping in step S100 shown in FIG. 8 is performed.

Details of a grouping process in the step S100 shown in FIG. 8 is performed will be described with reference to FIG. 9.

First, the node information 410 on a wireless base station AP of the number of ungrouped wireless I/F>α is sorted (step S200).

Here, α denotes the number of access-side wireless interfaces 100 for covering wireless terminal devices STAs, from among the wireless interfaces 110 mounted on the wireless base station AP and is an integer value that satisfies "0≦α≦ the total number of wireless interfaces included in wireless base station AP".

α is a common fixed value for all the wireless base stations APs, and may be a variable value which is different for each of the wireless base stations APs.

According to this exemplary embodiment, it is assumed that α=1, namely, all the numbers of access-side wireless interfaces 110 for covering the wireless terminal devices STAs are 1.

As an order of priority used when the node information 410 is sorted, for example, a wireless base station AP having the large number 411 of available wired interfaces, that is, a wireless base station AP connected to the external network NW, has much traffic, and thus, a first priority is provided thereto.

A wireless base station AP having the small total number 414 of wireless interfaces should be allocated with a small amount of channel resources, so that a second priority is provided thereto.

A wireless base station AP having the large number 416 of adjacent wireless base stations should be allocated with a large amount of channel resources, so that a third priority is provided thereto.

A wireless base station AP having the large number 416 of coverable wireless terminal devices needs much traffic, so that a fourth priority is provided thereto.

The sort order of the node information 410 used to perform the aforementioned grouping is an example, and may be freely changed according to, for example, a configuration of the mesh network or priority information on the wireless base stations APs.

When the node information 410 are sorted in the aforementioned priority order, the wireless base stations AP are sorted in descending order of the numbers 411 of available wired interfaces, or in ascending order of the numbers 414 of wireless interfaces, or in descending order of the numbers 415 of adjacent wireless base stations, or in descending order of the numbers 416 of coverable wireless terminal devices.

For this reason, when sorting is performed in the aforementioned order of priority on the basis of the node information 410 shown in FIG. 6, the wireless base stations AP are sorted in descending order of the numbers 411 of available wired interfaces, and the wireless base station A corresponds to NUMBER 1.

Next, in ascending order of the numbers 414 of wireless interfaces, an order of "the wireless base station C→the wireless base station D→the wireless base station B" is obtained, so that the wireless base station C has NUMBER 2, the wireless base station D has NUMBER 3, and the wireless base station B has NUMBER 4.

FIG. 10 illustrates a sort result in a case where the node information 410 shown in FIG. 6 is sorted in the aforementioned order of priority.

A wireless base station AP having the number 413 of ungrouped wireless interface of less than α is excluded from the sorting target and is excluded from processes described later.

According to this exemplary embodiment, it is assumed that α=1. Thus, in the first process, the wireless base station AP excluded from the sorting target does not exist in the node information 410 shown in FIG. 6. However, after the step S204/No, the process proceeds to the step S200, and in the second process, the wireless base station C is excluded from the sorting target.

Next, in the order of actual nodes in the node information 410 sorted in the aforementioned order of priority, a range of a wireless base station AP that performs grouping is determined with reference to the topology information 450 (S201).

For example, the wireless base station AP connected to the external network NW, that is, the wireless base station AP having the number 411 of available wired interfaces is provided with a small range of the wireless base station AP that performs the grouping. In addition, the wireless base station AP having the small total number 414 of wireless interfaces is provided with a small range of the wireless base station AP that performs the grouping.

Decreasing the range of the wireless base station AP that performs the grouping makes it possible to reduce the number of wireless base stations AP that generate transmission wave conflicts in wireless communication.

The condition of determining the range of the wireless base station AP that performs the grouping is an example, and the condition of determining can be changed so that the range of the wireless base station AP that performs the grouping can be flexibly controlled.

Next, in the range of the wireless base stations APs that perform the grouping determined in the step S201, wireless base stations APs having the number 413 of ungrouped wireless interfaces of a or more are grouped into the same group (S202).

The grouping information is stored in the storage unit 400 along with the topology information 450.

Next, 1 is subtracted from the number 413 of the ungrouped wireless interfaces of each of the wireless base stations APs that constitute one group (S203).

Figure 11:
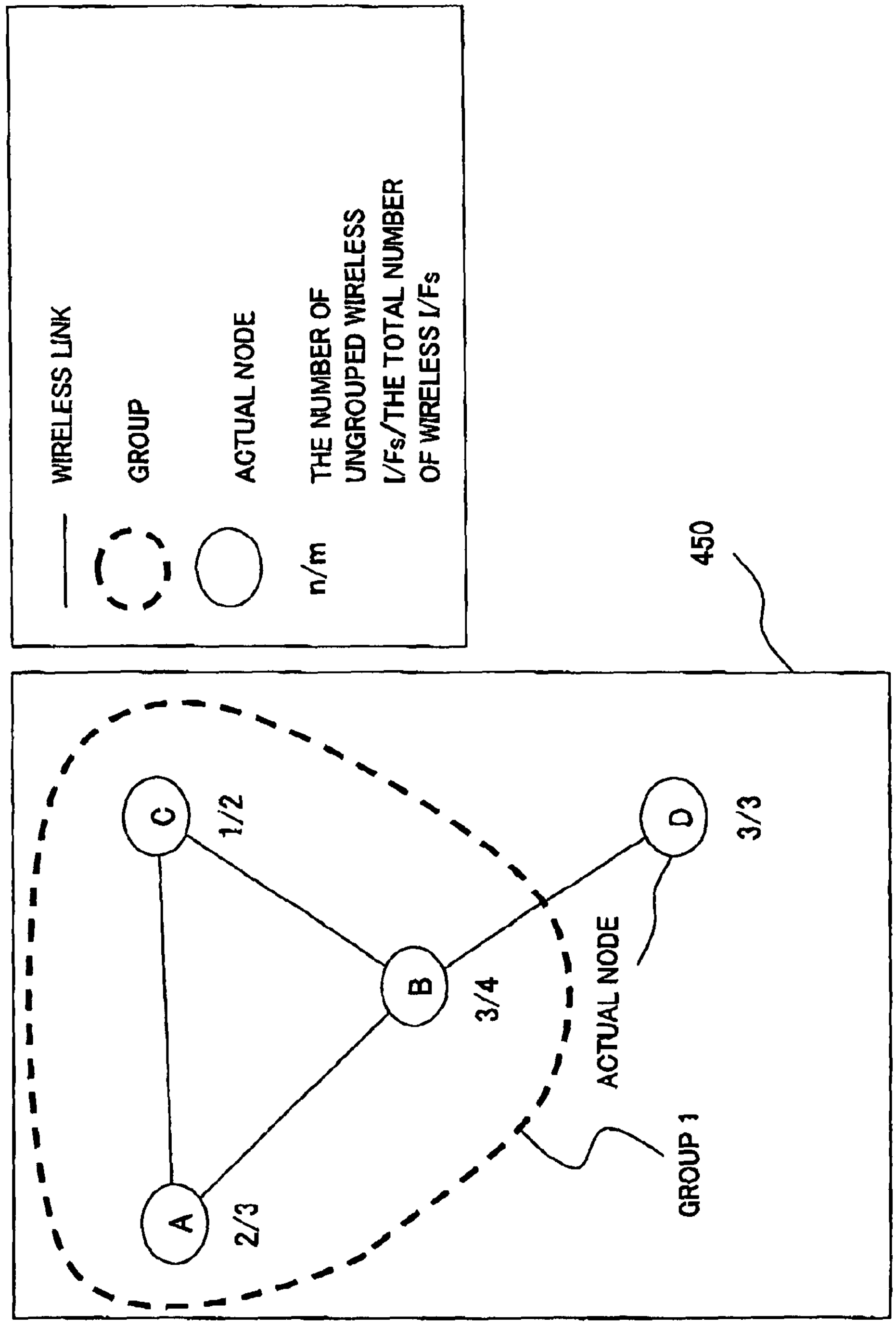
FIG. 11 illustrates an image diagram of topology information 450 in a state where a group 1 is formed.

FIG. 11 illustrates an image diagram of the topology information 450 in a state where group 1 is formed.

FIG. 12 illustrates node information 410 in the state where the group 1 is formed.

As shown in FIGS. 11 and 12, 1 is subtracted from the number 413 of ungrouped wireless interface of the wireless base stations A, B, and C which constitute the group 1 in the states shown in FIGS. 6 and 7.

Next, it is checked whether group allocation to the wireless interfaces 110 in all of the node information 410 is completed (S204). When group allocation to the wireless interfaces 110 in all of the node information 410 is not completed (step S204/No), the process proceeds to the step S200 again, where group allocation to the wireless interfaces 110 in all of the node information 410 is performed.

When it is determined that group allocation to the wireless interfaces 100 in all of the node information 410 is completed (step S204/Yes), the process is terminated.

Accordingly, group allocation to backbone-side wireless interfaces 110 in all of the node information 410 is performed, and the grouping process in the step S100 is completed.

FIG. 13 illustrates topology information 450 in a state where the grouping process in the step S100 is completed, and FIG. 14 illustrates node information 410 in a state where the grouping process in the step S100 is completed.

<Details of Virtual Node Generating Process in Step S101>

Next, details of a virtual node generating process in the step S101 shown in FIG. 8 will be described with reference to FIG. 15.

Figure 15:
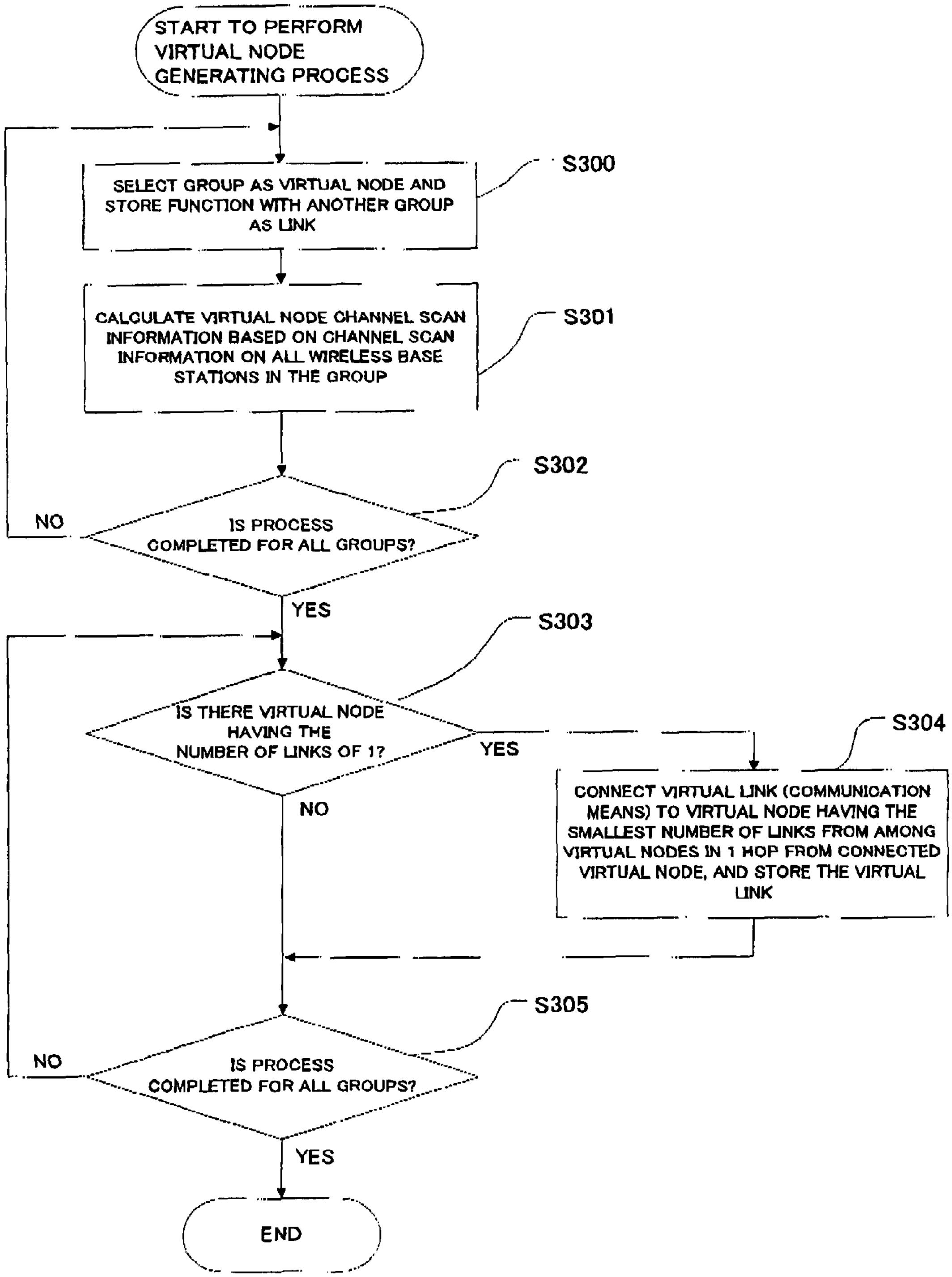
FIG. 15 is a flowchart illustrating details of a virtual node generating process performed in step S101 shown in FIG. 8.

By performing the virtual node generating process shown in FIG. 15, a method of allocating sparse wireless channels can be applied to the backbone-side wireless interfaces 110.

First, a single group is selected as a single virtual node, and a junction with another group is stored as a virtual wireless link of another virtual node (S300).

This is performed on all groups.

Next, information on each of wireless base stations APs that constitute each group is stored in the storage unit 400 as a configuration node 421.

FIG. 16 illustrates a state where the configuration node 421 is stored in the storage unit 400.

As shown in FIG. 16, as the configuration node 421 of the group 1, actual nodes A, B, and C shown in FIG. 13 are stored in the storage unit 400.

As a configuration node 421 of group 2, actual nodes A, B, and D shown in FIG. 13 are stored in the storage unit 400.

Also, as a configuration node 421 of group 3, actual nodes B and D shown in FIG. 13 are stored in the storage unit 400.

Next, channel scan information 417 on all wireless base stations APs that constitute each group is added to calculate virtual node channel scan information 422, and the calculated virtual node channel scan information 422 is stored in the storage unit 400 (S301).

The virtual node channel scan information 422 can be obtained by calculating an average value of the channel scan information 417 on all the wireless base stations APs, or performing weighting by use of the topology information 450 or the like and using the channel scan information 417.

For example, assume that an average value is applied to calculate the virtual node channel scan information 422. In this case, in the virtual node channel scan information 422 of the group 1, channel scan information 417 on the actual node A is "10, 44, . . . ", channel scan information 417 on the actual node B is "0, 7, . . . ", and channel scan information 417 on the actual node C is "11, 0, . . . ".

Therefore, a wireless channel 1 of the virtual node channel scan information 422 on the group 1 is "(10+0+11)/3=7", and a wireless channel 2 of the virtual node channel scan information 422 on the group 1 is "(44+7+0)/3=17".

This is performed on each wireless channel (each of the wireless channels 1 to 14), and the virtual node channel scan information 422 of the group 1 is calculated.

The virtual node channel scan information 422 of the group 1 is "7, 17, . . . ". In addition, the virtual node channel scan information 422 of the group 2 is "17, 37, . . . ".

Further, the virtual node channel scan information 422 of the group 3 is "20, 34, . . . ".

Next, it is determined whether calculation of the virtual node channel scan information 422 of all groups is completed (step S302). When it is determined that the calculation of the virtual node channel scan information 422 of all groups is not completed (step S302/No), the process proceeds to the step S300 again to calculate the virtual node channel scan information 422 of all groups.

On the other hand, when it is determined that calculation of the virtual node channel scan information 422 of all groups is completed (step S302/Yes), a next process is performed.

FIG. 16 illustrates a state where the virtual node channel scan information 422 of all groups are calculated and the obtained values are stored in the storage unit 400 as the virtual node channel scan information 422.

Next, it is determined whether there is a virtual node having the number of virtual wireless links of 1 (S303). When it is determined that there is the virtual node having the number of virtual wireless links of 1 (step S303/Yes), a virtual wireless link is set to a virtual node having the smallest number of virtual wireless links from among all virtual nodes that exist within 1 hop from a virtual node connected to the virtual node having the number of virtual wireless links of 1, and is stored as the virtual wireless link (communication failure).

The virtual nodes connected by the virtual wireless link (communication failure), that is, groups connected by the virtual wireless link (communication failure), can use the same wireless channel when a wireless channel is allocated.

Next, it is determined for all groups whether determination as to whether there is the virtual node having the number of virtual wireless links of 1 is completed (step S305). When it is determined that determination as to whether or not the virtual node having the number of virtual wireless links of 1 is not completed for all groups (step S305/No), the process proceeds to the step S303 to determine whether there is the virtual node having the number of virtual wireless links of 1 is performed on all groups.

On the other hand, when it is determined that determination as to whether there is the virtual node having the number of virtual wireless links of 1 is completed for all groups (step S305/Yes), the process is terminated.

Accordingly, the virtual node generating process in the step S101 is terminated.

Figure 17:
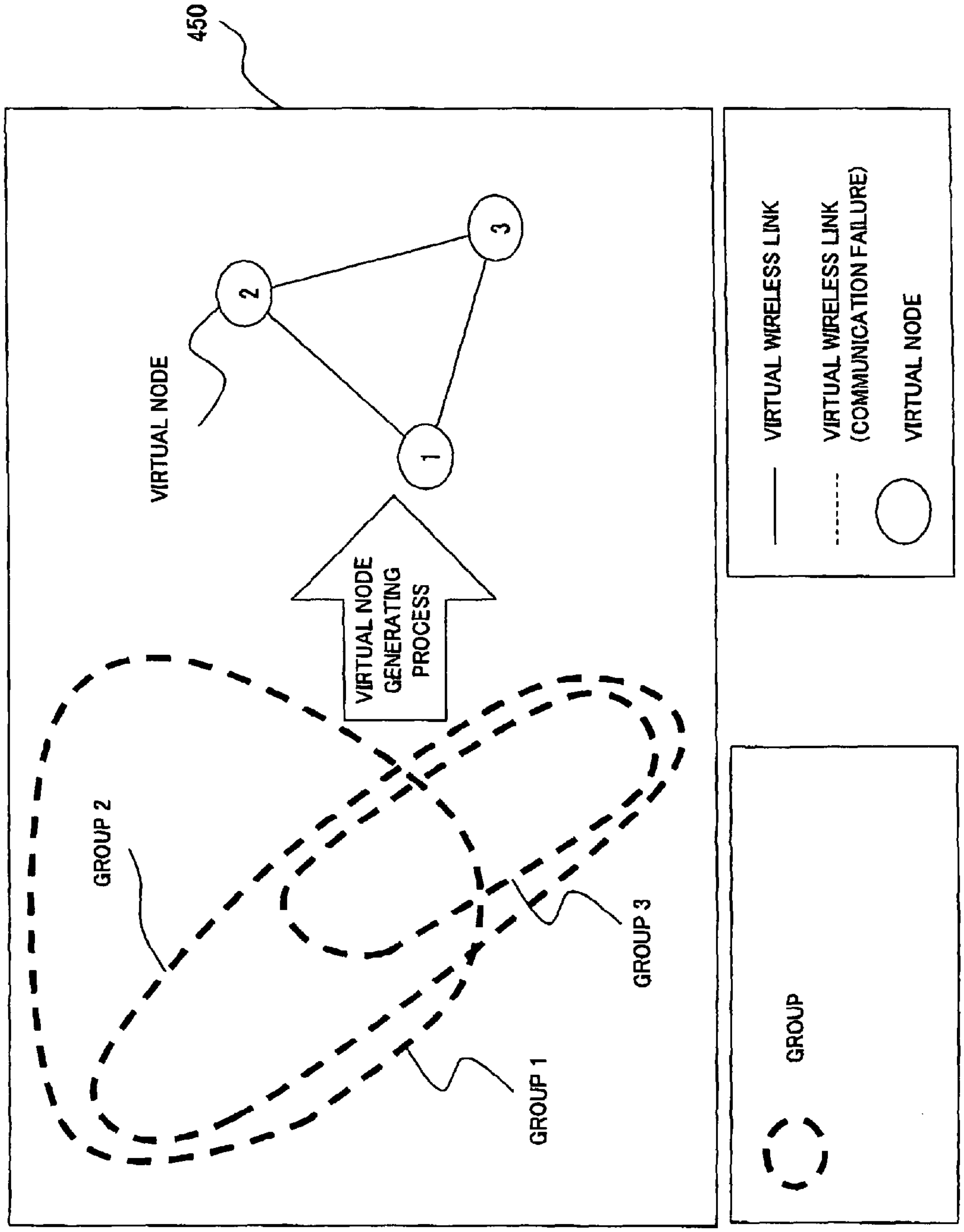
FIG. 17 is a diagram illustrating a configuration of virtual nodes in a state after the virtual node generating process in the step S101 shown in FIG. 8 is performed.

FIG. 17 illustrates a configuration of a virtual node in a state where the virtual node generating process is terminated.

In the topology information 450 shown in FIG. 13, the virtual node having the number of virtual wireless links of 1 does not exist. Therefore, determination as to whether there is the virtual node having the number of virtual wireless links of 1 will be described based on a little complex configuration shown in FIG. 18.

Figure 18:
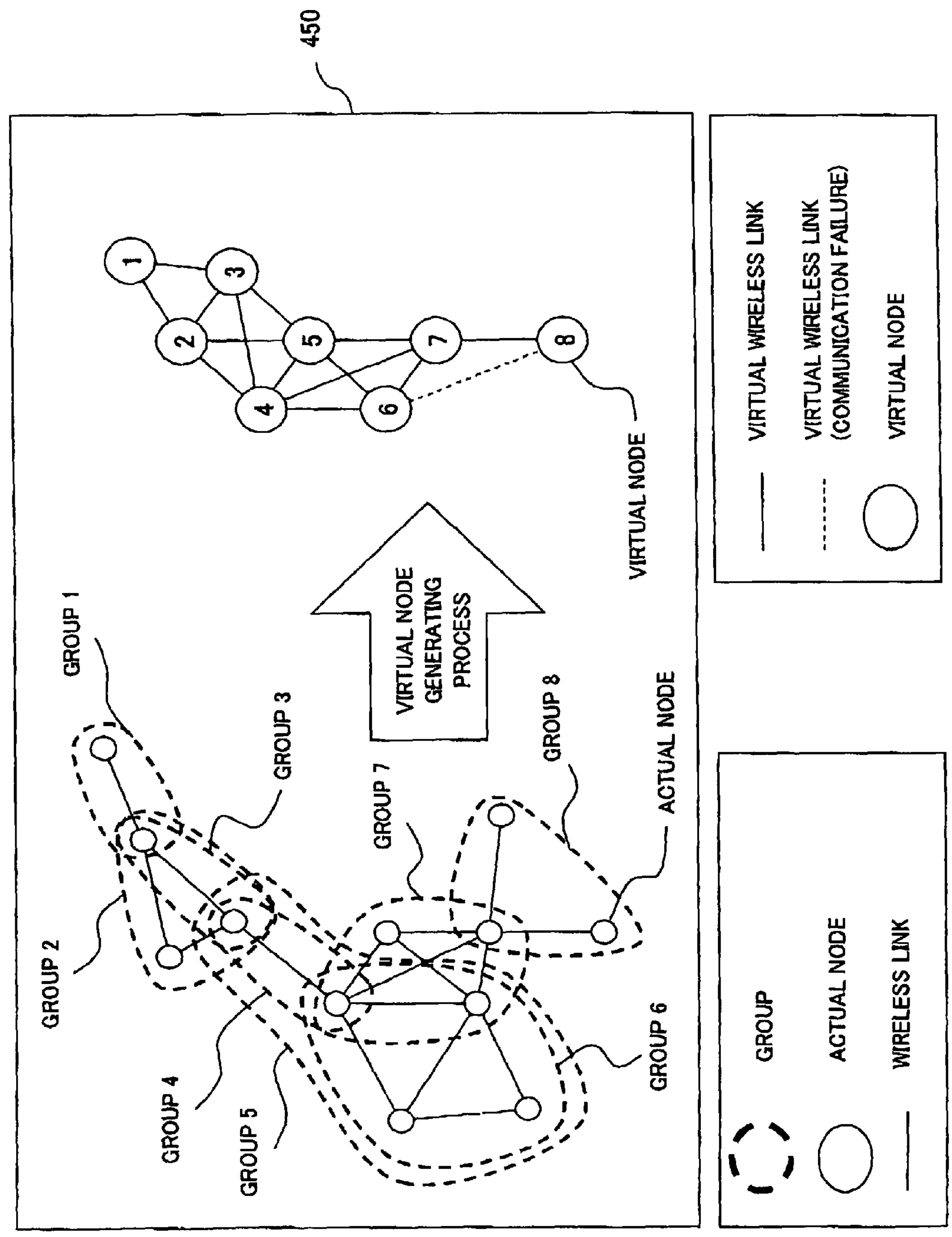
FIG. 18 is a diagram for explaining a process of determining whether or not there is a virtual node having the number of virtual wireless links of 1.

In FIG. 18, a virtual node 8 corresponds to the virtual node having the number of virtual wireless links of 1.

Therefore, attention is paid to a virtual node 7 linked to the virtual node 8.

The numbers of virtual wireless links between the virtual nodes 4, 5, and 6 that communicate with the virtual node 7 in one HOP and other virtual nodes, respectively, are 5, 5, and 3.

Accordingly, the virtual nodes 6 and 8 that have the smallest number of virtual wireless links to other virtual nodes are stored in the storage unit 400 as a virtual wireless link (communication failure).

<Details of Channel Allocation to Backbone-Side Wireless Interface in Step S102>

Figure 19:
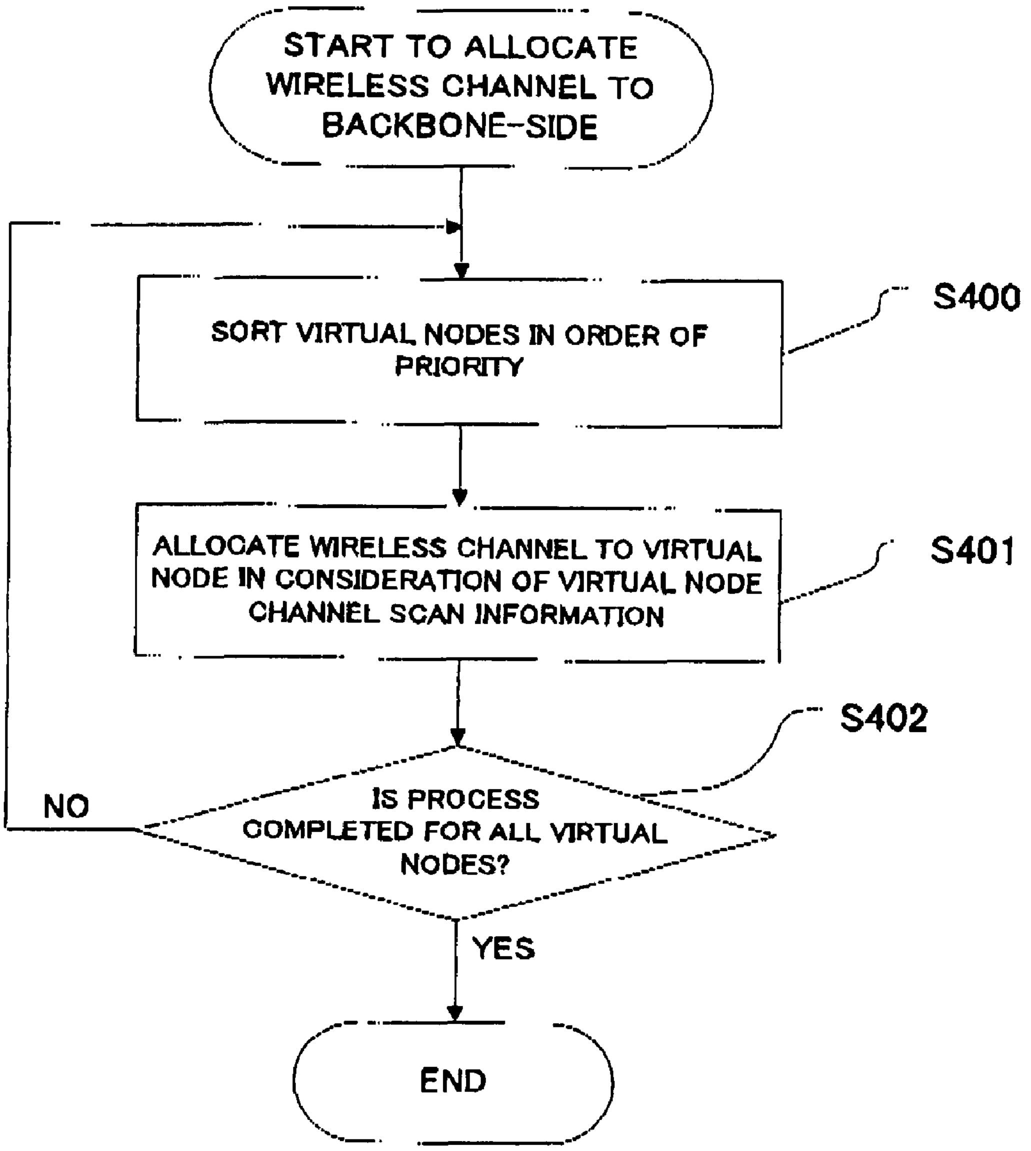
FIG. 19 is a flowchart illustrating details of channel allocation to a backbone-side wireless interface 110 in step S102 shown in FIG. 8.

Next, details of channel allocation to the backbone-side wireless interface 110 in the step S102 shown in FIG. 8 will be described with reference to FIG. 19.

First, virtual nodes are sorted in an order of priority (S400).

Sorting is performed on the virtual nodes in descending order of the total numbers 412 of wired interfaces of all wireless base stations APs, or in ascending order of the numbers of wireless base stations APs which constitute the virtual nodes.

For this reason, when sorting is performed in the aforementioned order of priority on the basis of the virtual node shown in FIG. 17, a virtual node 1, a virtual node 2, and a virtual node 3 are arranged in descending order of the total numbers 412 of the wired interfaces.

Next, in consideration of the virtual node channel scan information 422, wireless channels are allocated to the virtual nodes that are sorted in the order of priority in the step S400 (S401).

The wireless channels are allocated so that the virtual nodes are spaced from each other based on virtual node channel scan information 422.

Here, the virtual nodes connected to the virtual wireless link (communication failure) cannot actually communicate with each other, so that wireless channels can be allocated duplicatedly.

According to this exemplary embodiment, based on the virtual nodes shown in FIG. 17, wireless channels are allocated in order of the priority, that is, in order of "virtual node 1→virtual node 2→virtual node 3".

First, based on the virtual node channel scan information 422 of "7, 17, . . . " of the virtual node 1, a wireless channels having the smallest value of received signal strength from among wireless channels 1ch to 14ch is allocated to the virtual node 1.

Since a received signal strength is allocated to each channel (each of the channels 1 to 14), the virtual node channel scan information 422 selects a wireless channel having the smallest value of received signal strength, and the selected wireless channel is allocated.

For example, referring to FIG. 5, the wireless channel 13ch has the smallest value of received signal strength from among the wireless channels 1ch to 14ch, so that the wireless channel 13ch is allocated.

According to this exemplary embodiment, the wireless channel 6ch that corresponds to a wireless channel having the smallest value of received signal strength is allocated to the virtual node 1.

Next, based on the virtual node channel scan information 422: "17, 37, . . . " of the virtual node 2, a wireless channel that has the smallest value of received signal strength and is spaced by 5ch or more from the wireless channel 6ch so as not to generate interference with the wireless channel 6ch allocated to the virtual node 1, is allocated to the virtual node 2.

According to this exemplary embodiment, in order not to generate interference with the wireless channel 6ch allocated to the virtual node 1, the wireless channel 1ch, which is spaced by 5ch or more from the wireless channel 6ch and corresponds to a wireless channel having the smallest value of received signal strength, is allocated.

Next, in order not to generate interference with the wireless channel 6ch allocated to the virtual node 1 and the wireless channel 1ch allocated to the virtual node 2, a wireless channel, which is spaced by 6ch or more from the wireless channels 6ch and 1ch and corresponds to a wireless channel having the smallest value of received signal strength, is allocated to the virtual node 3.

The wireless channel ch11 is allocated, which is spaced by 5ch or more from the wireless channels 6ch and 1ch so as not to generate interference with the wireless channel 6ch allocated to the virtual node 1 and the wireless channel 1ch allocated to the virtual node 2 and corresponds to a wireless channel having the smallest value of received signal strength.

When the number of the virtual nodes increases in the aforementioned processes of channel allocation to the virtual nodes, a wireless channel which is spaced by 5ch or more from wireless channels allocated to each virtual node cannot be obtained. Therefore, in this case, channel allocation is performed in consideration of distances between the virtual nodes.

When distances between the virtual nodes are far, the number of interference occurrences decreases. Thus, even if a wireless channel within 5ch from the wireless channels allocated to the virtual nodes is allocated, the wireless channel within 5ch is allocated to a virtual node when the number of interference occurrences is low.

For example, description will be given with reference to the virtual nodes shown in FIG. 18. Even if a wireless channel within 5ch from the wireless channel allocated to the virtual node 1 is allocated to the virtual node 8, a distance between the virtual nodes 1 and 8 is far, so that the number of interference occurrences decreases. For this reason, the wireless channel although within the 5ch can be allocated to the virtual node 8.

As described above, in consideration of the number of interference occurrences between adjacent virtual nodes, a wireless channel is allocated to each virtual node so that the virtual nodes are spaced from each other.

According to this exemplary embodiment, in the processes of channel allocation to the virtual nodes, a wireless channel that is spaced by 5ch or more is selected in order not to generate interference with the wireless channels allocated to the virtual nodes. However, a value β between wireless channels for not generating interference is not limited to the 5ch, and may be changed to select a wireless channel spaced by 6ch, 7ch, or the like.

In this exemplary embodiment, the value β between wireless channels is set to be 5ch or more so as not to generate interference in the processes of channel allocation to the virtual nodes. This is because a wireless channel which does not overlap in the 2.5 GHz band is considered (here, 14ch does not interfere 11ch). When another frequency band or modulation method is applied, the value β between wireless channels is set to an arbitrary value so as not to generate interference in consideration of applied frequency band or modulation method, so that wireless channel allocation is performed.

In this exemplary embodiment, on the basis of the virtual node channel scan information 422, a wireless channel having the smallest value of received signal strength from among the wireless channels 1ch to 14ch is allocated to each virtual node in order not to generate interference with a wireless channel allocated to a virtual node. However, a configuration is possible that allocates a wireless channel having a smaller value of received signal strength than a predetermined threshold.

In this case, the predetermined threshold may be arbitrarily set and changed.

When there is a plurality of wireless channels having smaller values of received signal strength than the predetermined threshold, received signal strengths of both adjacent wireless channels may be considered, so that an optimal wireless channel from among the plurality of wireless channels may be allocated, or a wireless channel having the smallest value of received signal strength may be allocated.

Next, it is determined for all of the virtual nodes whether wireless channel allocation is completed (step S402). When it is determined that wireless channel allocation to all the virtual nodes is not completed (step S402/No), the process proceeds to the step S400 to perform wireless channel allocation to all the virtual nodes.

Thereafter, when it is determined that wireless channel allocation to all the virtual nodes is completed (step S402/Yes), the process is terminated.

Accordingly, wireless channel allocation to all groups, that is, wireless channel allocation to the backbone-side wireless interfaces 110 of the wireless base stations APs, is completed.

FIG. 20 illustrates a state where wireless channel allocation to the backbone-side wireless interface 110 of the wireless base stations APs is completed.

As shown in FIG. 20, the wireless channel 6ch is allocated to the group 1, the wireless channel 1ch is allocated to the group 2, and the wireless channel 11ch is allocated to the group 3.

According to this exemplary embodiment, the virtual node channel scan information 422 includes information that represents a usage state of wireless channels around groups. With this configuration, wireless channel allocation is performed so that interference with another system does not occur.

<Details of Channel Allocation to Access-Side Wireless Interface in Step S103>

Figure 21:
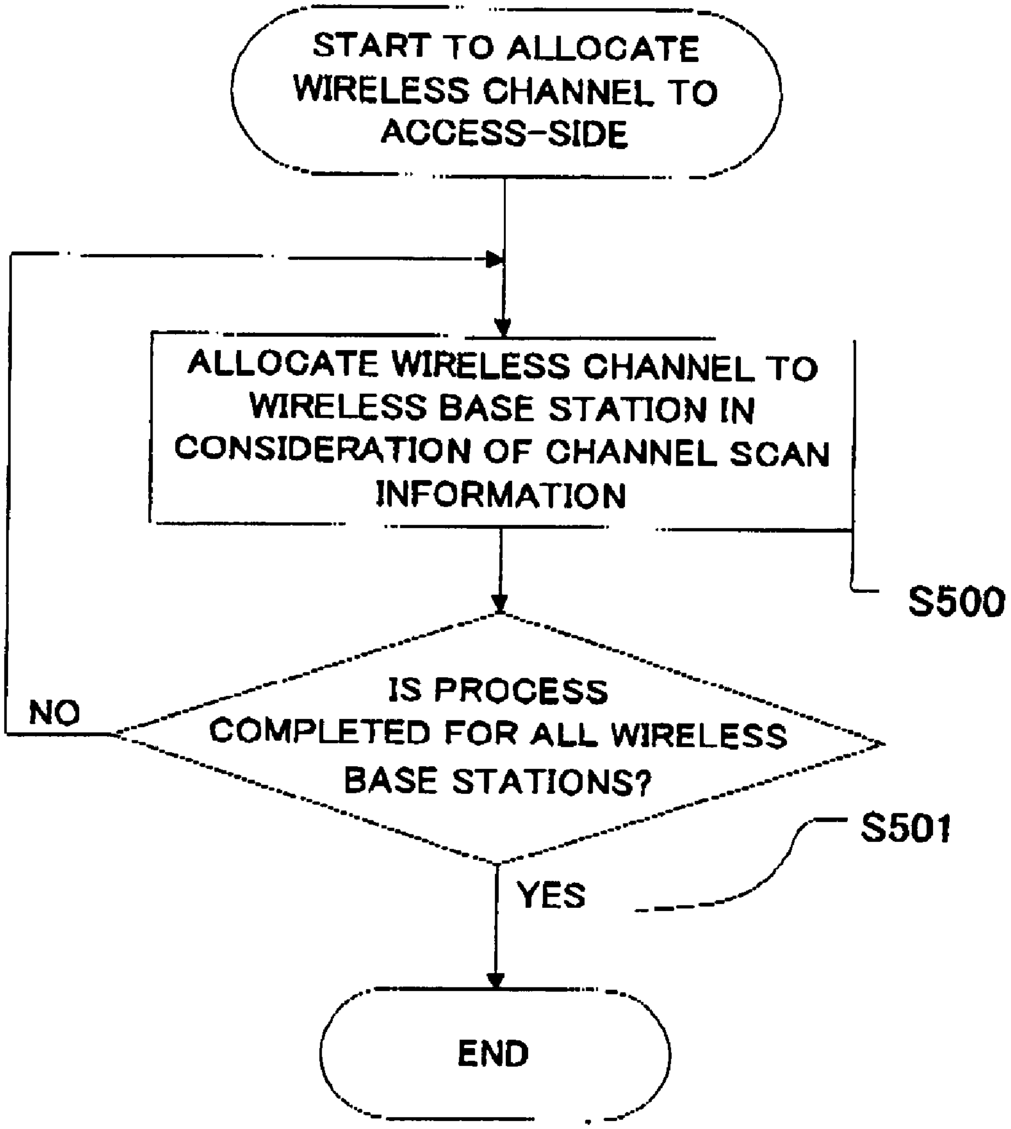
FIG. 21 is a flowchart illustrating details of channel allocation to an access-side wireless interface 110 of step S103 shown in FIG. 8.

Next, details of channel allocation to the access-side wireless interfaces 110 in the step S103 shown in FIG. 8 will be described with reference to FIG. 21.

Channel allocation to the access-side wireless interfaces 110 is performed on wireless interfaces 110 which do not belong to groups.

First, in consideration of the channel scan information 417, a wireless channel is allocated to a wireless interface 110 of a wireless base station AP (S500).

The wireless channel allocation to an access-side wireless interface 110 of the wireless base station AP is performed in order of "group 1→group 2→group 3", that is, in the aforementioned order of priority of the sorted virtual nodes.

In the group 1, the wireless channel allocation to the access-side wireless interfaces 110 of wireless base stations is performed in order of wireless base stations sorted as shown in FIG. 10, that is, in order of "wireless base station A→wireless base station C→wireless base station B".

First, channel allocation to the access-side wireless interface 110 of the wireless base station A is performed.

The channel allocation to the access-side wireless interface 110 of the wireless base station A is performed as follows. The wireless channels 1ch and 6ch are allocated to the backbone-side wireless interface 110 of the wireless base station A by channel allocation to the backbone-side wireless interface 110 in the step S102. For this reason, a wireless channel which is spaced from the wireless channels 1ch and 6ch by 5ch or more and has the smallest value of received signal strength is allocated, so that the wireless channel 11ch is allocated to the wireless base station A.

Next, channel allocation to an access-side wireless interface 110 of the wireless base station C is performed. The channel allocation to the access-side wireless interface 110 of the wireless base station C is performed as follows. The wireless channel 6ch is allocated to the backbone-side wireless interface 110 of the wireless base station C by the channel allocation to the backbone-side wireless interface 110 in the step S102. Consequently, a wireless channel that is spaced by 5ch or more from the wireless channel 6ch and has the smallest value of received signal strength is allocated to the backbone-side wireless interface 110 of the wireless base station C.

Here, the wireless channel allocation is performed so as not to generate interference with the wireless channel 11ch allocated to the wireless base station A adjacent to the wireless base station C.

As a consequence, a wireless channel 1ch is allocated to the wireless base station C.

Next, channel allocation to an access-side wireless interface 110 of the wireless base station B is performed.

The channel allocation to the access-side wireless interface 110 of the wireless base station B is performed as follows. The wireless channels 1ch, 6ch, and 11ch are allocated to the backbone-side wireless interface 110 of the wireless base station B by the channel allocation to the backbone-side wireless interface 110 in the step S102. Consequently, a wireless channel that is spaced by 5ch or more from the wireless channels 1ch, 6ch, 11ch and has the smallest value of received signal strength is allocated.

In this case, the wireless channel that is spaced by 5ch or more does not exist. Therefore, a wireless channel which does not generate interference with the wireless channels 1ch, 6ch, and 11ch allocated to the backbone-side wireless interface 110 even if the wireless channel is within 5ch or has influence of interference as less as possible is selected.

Then, the selected wireless channel is allocated to the wireless channel B.

Here, the wireless channel is allocated so that the wireless channel does not generate interference with the wireless channels 11ch and 1ch allocated to the wireless base stations A and C adjacent to the wireless base station B.

Accordingly, the wireless channel 14ch is allocated to the wireless base station B.

By the aforementioned processes, wireless channel allocation to the access-side wireless interfaces 110 of all of the wireless base stations A, B, and C which belong to the group 1 is completed.

Next, wireless channel allocation to the access-side wireless interfaces of the wireless base stations A, B, and D that belong to the group 2 is performed.

Since channel allocation to the access-side wireless interfaces 110 of the wireless base stations A and B is completed, channel allocation to an access-side wireless interface 110 of the wireless base station D is performed.

The channel allocation to the access-side wireless interface 110 of the wireless base station D is performed as follows. The wireless channels 1ch and 11ch are allocated to the backbone-side wireless interface 110 of the wireless base station D by the channel allocation to the backbone-side wireless interface 110 in the step S102. Accordingly, a wireless channel, which is spaced by 5ch or more from the wireless channels 1ch and 11ch and has the smallest value of received signal strength, is allocated.

Here, the wireless channel is allocated so as not to generate interference with a wireless channel 14ch allocated to the wireless base station B adjacent to the wireless base station D.

This allows the wireless channel 6ch to be allocated to the wireless base station D.

By the aforementioned processes, wireless channel allocation to the access-side wireless interfaces 110 of all the wireless base stations A, B, and D which belong to the group 2 is completed.

Next, it is determined whether wireless channel allocation to all wireless base stations APs is completed (step S501). When it is determined that the wireless channel allocation to all wireless base stations APs is not completed (step S501/No), the process proceeds to the step S500 to perform wireless channel allocation to all wireless base stations APs.

On the other hand, when it is determined that the wireless channel allocation to all wireless base stations APs is completed (step S501/Yes), the process is terminated.

Accordingly, the wireless channel allocation to the access-side wireless interfaces 110 of the wireless base stations APs is completed.

FIG. 22 illustrates a state where the wireless channel allocation to the access-side wireless interfaces 110 of the wireless base stations APs.

The aforementioned channel allocation to the access-side wireless interfaces may employ the method of the channel allocation to the backbone-side wireless interfaces.

For example, when another frequency band or modulation method is applied, the value β between wireless channels is set to be an arbitrary value in consideration of the applied frequency band or modulation method so as not to generate interference, so that wireless channel allocation is performed.

Also, a wireless channel having a smaller value of received signal strength than a predetermined threshold may be allocated.

In this case, the predetermined threshold may be arbitrarily set and changed.

Assume that there is a plurality of wireless channels having smaller values of received signal strength than the predetermined threshold. In this case, in consideration of received signal strengths of both adjacent wireless channels, an optimal wireless channel from among the plurality of wireless channels may be allocated, or a wireless channel having the smallest value of received signal strength may be allocated.

<Feedback Process in Step S104>

Next, a feedback process in the step S104 shown in FIG. 8 will be described.

When much interference occurs during the wireless channel allocation to the wireless interfaces 110, the feedback process is performed in such a manner that a weighting operation for the channel scan information 417 is changed and the wireless channel allocation is performed again.

Performing the feedback process in the step S104 enables to avoid channel interference between the backbone-side wireless interfaces 110 and the access-side wireless interfaces 110.

FIG. 23 shows a state where a series of processes shown in FIG. 8 are terminated and a wireless channel is allocated to each of the wireless base stations APs which constitute the public wireless access system.

As described above, the wireless communication system performs the wireless channel allocation to the access-side wireless interfaces 110 for covering wireless terminal devices STAs and to the backbone-side wireless interfaces 110 for connecting the wireless base stations Aps with each other, on the basis of information on the access-side wireless interfaces 110 (for example, information on the number of access-side wireless interfaces, and information on the number of wireless terminal devices covered by the access-side wireless interfaces) and information on the backbone-side wireless interfaces 110 (for example, information on the number of adjacent wireless base stations connected to a wireless base station, and network topology information).

Accordingly, it is possible to perform wireless channel allocation to the access-side wireless interfaces 110 and to the backbone-side wireless interfaces 110 so as not to generate interference between the access-side wireless interfaces 110 for covering the wireless terminal devices STAs and the backbone-side wireless interfaces 110 for connecting the wireless base stations APs with each other.

When channel allocation to the backbone-side wireless interfaces 110 and the access-side wireless interfaces 110 is performed, interference may occur between the wireless channels allocated to the backbone-side wireless interfaces 110 and the wireless channels allocated to the access-side wireless interfaces 110. In this case, the feedback process is performed, and the channel allocation is performed again.

As a consequence, the wireless channel allocation is performed so as not to generate interference between the access-side wireless interfaces 110 for covering wireless terminal devices STAs and the backbone-side wireless interfaces 110 for connecting the wireless base stations APs. This enables proper wireless channel allocation to the entire wireless mesh network.

When allocating wireless channels to the backbone-side wireless interfaces 110, the wireless communication system groups wireless base stations APs on the basis of information such as the topology information 450 which represents a state of connection between wireless base stations APs, the total number 414 of wireless interfaces, and the number 416 of wireless terminal devices covered by the access-side wireless interfaces 110. The number of wireless base stations APs and a size of the group are appropriately controlled and thus the wireless communication system flexibly copes with various configurations.

Accordingly, even in a case where the number of wireless interfaces 110 mounted on the wireless base stations APs is not fixed, or even in an environment condition in which an arrangement of wireless base stations APs and the number of wireless terminal devices STAs connected to the wireless base stations APs are changed, flexible wireless channel allocation is possible.

In addition, the wireless communication system predicts interference between adjacent channels and calculates the channel scan information 417 for avoiding interference between wireless channels on the basis of the received signal strength acquired in the scan scheme of each wireless base station AP and the received signal strength prediction function fn(x) represented by the aforementioned Equation 1.

This enables a wireless channel that causes less interference occurrences to be allocated to each wireless base station AP.

Second Exemplary Embodiment

Next, a second exemplary embodiment of the present invention will be described.

Figure 24:
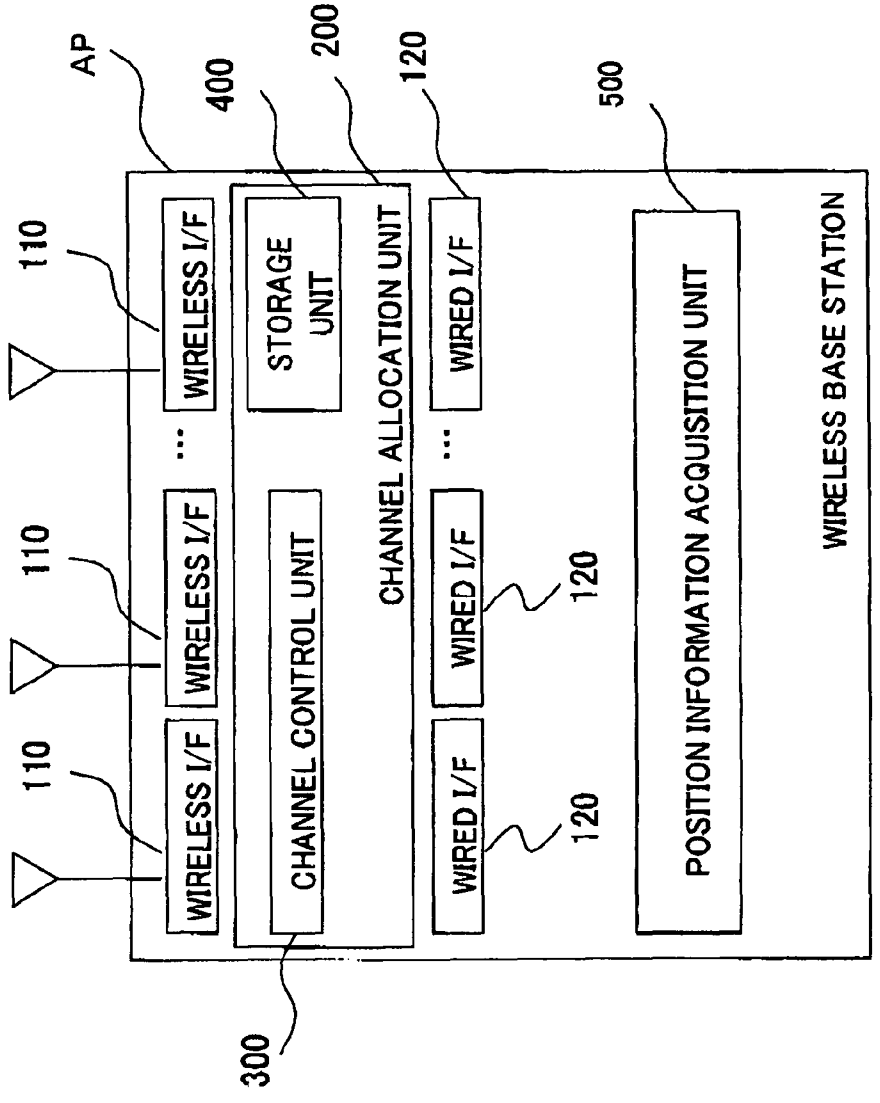
FIG. 24 is a diagram illustrating an internal configuration of a wireless base station AP which constitutes a wireless communication system according to a second exemplary embodiment.

In a wireless communication system according to the second exemplary embodiment, each wireless base station AP includes a position information acquisition unit 500 that acquires its own position information, as shown in FIG. 24.

Each wireless base station AP acquires its own position information by using the position information acquisition unit 500 and transmits node information 410 including the position information to a leader wireless base station A.

Accordingly, the leader wireless base station A acquires position information on each wireless base station AP, so that the leader wireless base station A performs wireless channel allocation in consideration of the position information on each wireless base station AP and therefore performs proper wireless channel allocation so as to reduce the number of interference occurrences.

If the position information acquisition unit 500 acquires its own position information, a method of acquiring the position information is not limited to a particular method, but may apply all kinds of position information acquisition methods, for example, a global positioning system (GPS).

Hereinafter, the wireless communication system will be described with reference to FIGS. 24 and 25.

<Internal Configuration of Wireless Base Station AP>

First, with reference to FIG. 24, description will be given to an internal configuration of a wireless base station AP that constitutes the wireless communication system.

The wireless base station AP that constitutes the wireless communication system includes a position information acquisition unit 500 as shown in FIG. 24.

The wireless base station AP according to the second exemplary embodiment has substantially the same functions as the wireless base station AP according to the first exemplary embodiment shown in FIG. 2 except for the above configuration.

The wireless base station AP allows a storage unit 400 to store the position information acquired by the position information acquisition unit 500.

Figure 25:
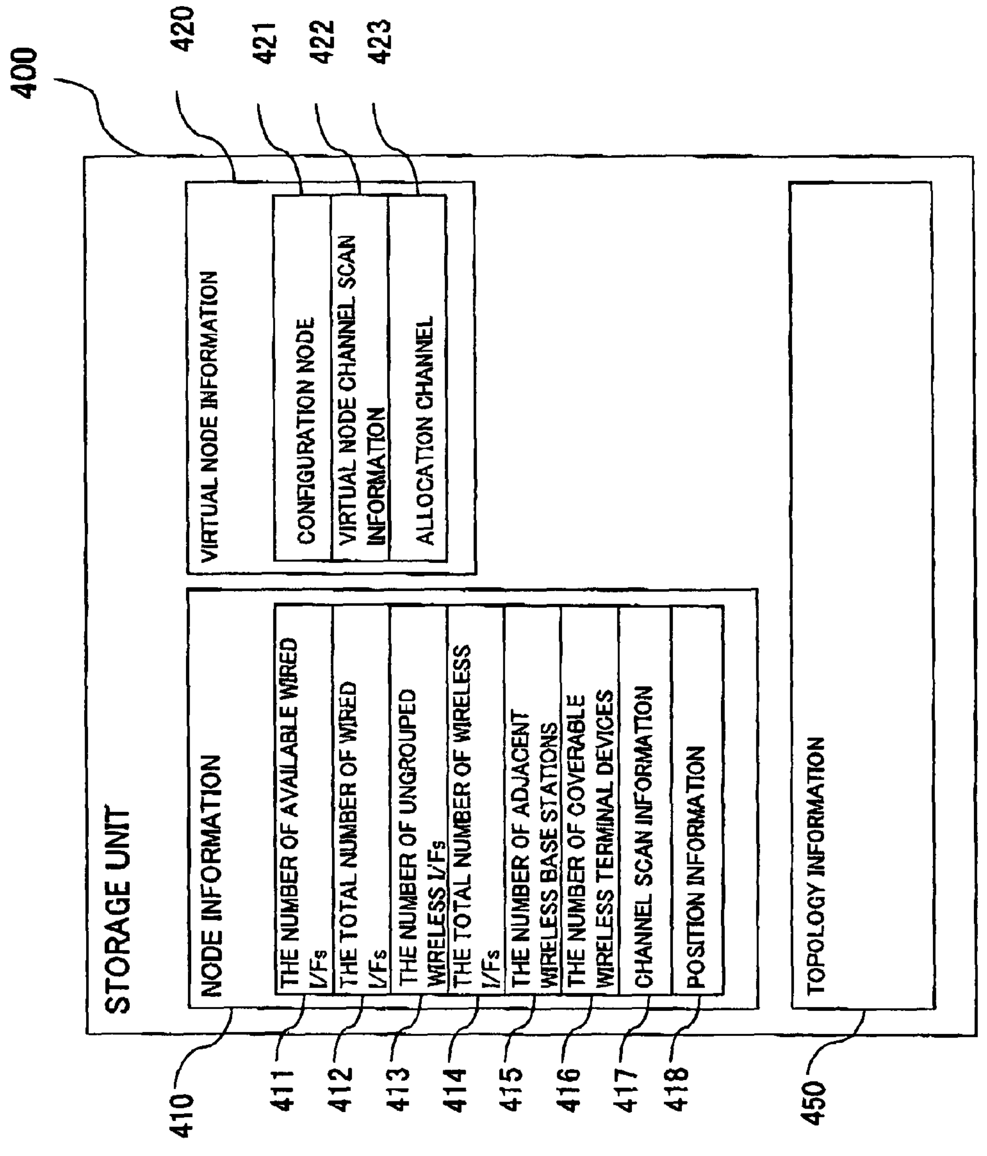
FIG. 25 is a diagram illustrating an internal configuration of a storage unit 400 of the wireless base station AP which constitutes the wireless communication system of the present invention.

FIG. 25 illustrates a configuration example of the storage unit 400 of the wireless base station AP.

As shown in FIG. 25, position information 418 is included in the node information 410 on each wireless base station AP, and the node information 410 including the position information 418 is transmitted to the leader wireless base station A.

With this configuration, the leader wireless base station A acquires the node information 410 including the position information 418 on each wireless base station AP, and based on the position information 418 on each wireless base station AP that constitutes the wireless base network, can perform wireless channel allocation in consideration of a position where each wireless base station is installed.

For example, channel allocation that is performed on wireless base stations APs that perform wireless communication and have a narrow wireless wave range, such as wall wireless base stations APs, allows little interference occurrences.

Accordingly, channel allocation is firstly performed on wireless base stations APs that exist in a region where the wireless base stations APs are locally crowded in order not to generate wave interference, or the channel allocation is performed on wireless base stations disposed at the border to the network in order to allow little interference occurrences. Therefore, channel allocation is performed in consideration of a position where each wireless base station AP is installed.

When allocating wireless channels to the backbone-side wireless interfaces 110, the wireless communication system groups the wireless base stations APs and controls the number of wireless base stations APs and a size of the group, on the basis of information such as the topology information 450 that represents a state of connection between wireless base stations APs, the total number 414 of wireless interfaces, the number 416 of wireless terminal devices covered by the access-side wireless interfaces 110, and the position information 418 on each wireless base station AP. Thus, the wireless communication system can flexibly cope with various constrictions.

Third Exemplary Embodiment

Next, a third exemplary embodiment of the present invention will be described.

The wireless communication system according to the first exemplary embodiment includes a plurality of wireless terminal devices STAs and a plurality of wireless base stations APs as shown in FIG. 1, and determines a leader wireless base station AP from among the plurality of wireless base stations APs. In addition, in the wireless communication system, each wireless base station AP transmits node information 410 to the leader wireless base station AP, and the leader wireless base station AP performs a series of processes shown in FIG. 8, so as to perform channel allocation to each wireless base station AP.

A wireless communication system according to the third exemplary embodiment, as shown in FIG. 26, newly includes a resource allocation apparatus 1 for allocating resource information used for wireless communication to each wireless base station AP. The resource allocation apparatus 1 acquires node information 410 on each wireless base station AP and performs a series of processes shown in FIG. 8 performed by the leader wireless base station AP on the basis of the acquired node information 410, so as to perform channel allocation to each wireless base station AP.

This allows the resource allocation apparatus 1 shown in FIG. 26 to perform the processes similar to those in the first and second exemplary embodiments.

As described above, a system having the resource allocation apparatus 1 for allocating resource information to each wireless base station AP is configured, and resource allocation apparatus 1 performs a series of processes shown in FIG. 8 to perform the processes similar to those in the first and second exemplary embodiments.

Applicable examples of the resource allocation apparatus 1 include a server apparatus for performing the resource allocation process on each wireless base station AP and a central control apparatus for performing central management and control on each wireless base station AP.

The aforementioned embodiments are exemplary embodiments of the present invention. The invention may, however, be embodied in many different forms and should not be construed as being limited to the embodiments set forth herein.

For example, ranges of wireless channels are different from each other depending on wireless methods or countries. For this reason, the ranges or the wireless channels are arbitrarily set and changed according to wireless methods and countries, and the aforementioned processes are performed in the ranges of the wireless channels.

In the wireless communication system according to the aforementioned embodiments, a wireless channel is allocated to each wireless base station AP. However, information allocated to each wireless base station AP is not limited to the wireless channel, but any information used to perform wireless communication may be allocated to each wireless base station AP as resource information.

In addition, according to the embodiments, the received signal strength prediction function f(x) is used to calculate channel scan information S(z) on a wireless channel x from Equation 1. However, the received signal strength prediction function f(x) can be used to calculate channel scan information Sm of a wireless channel m from the following Equation 2:

$$s_m = \sum_{n=1}^{N} R_n \times f(m - c_n)(m = 1, 2, \ldots M) \quad \text{[Equation 2]}$$

where, N denotes the total number of received signal strengths; Rn denotes a value of received signal strength; f(x) denotes a received signal strength prediction function; m denotes a range of a wireless channel; and Cn denotes a wireless channel number.

Figure 27:
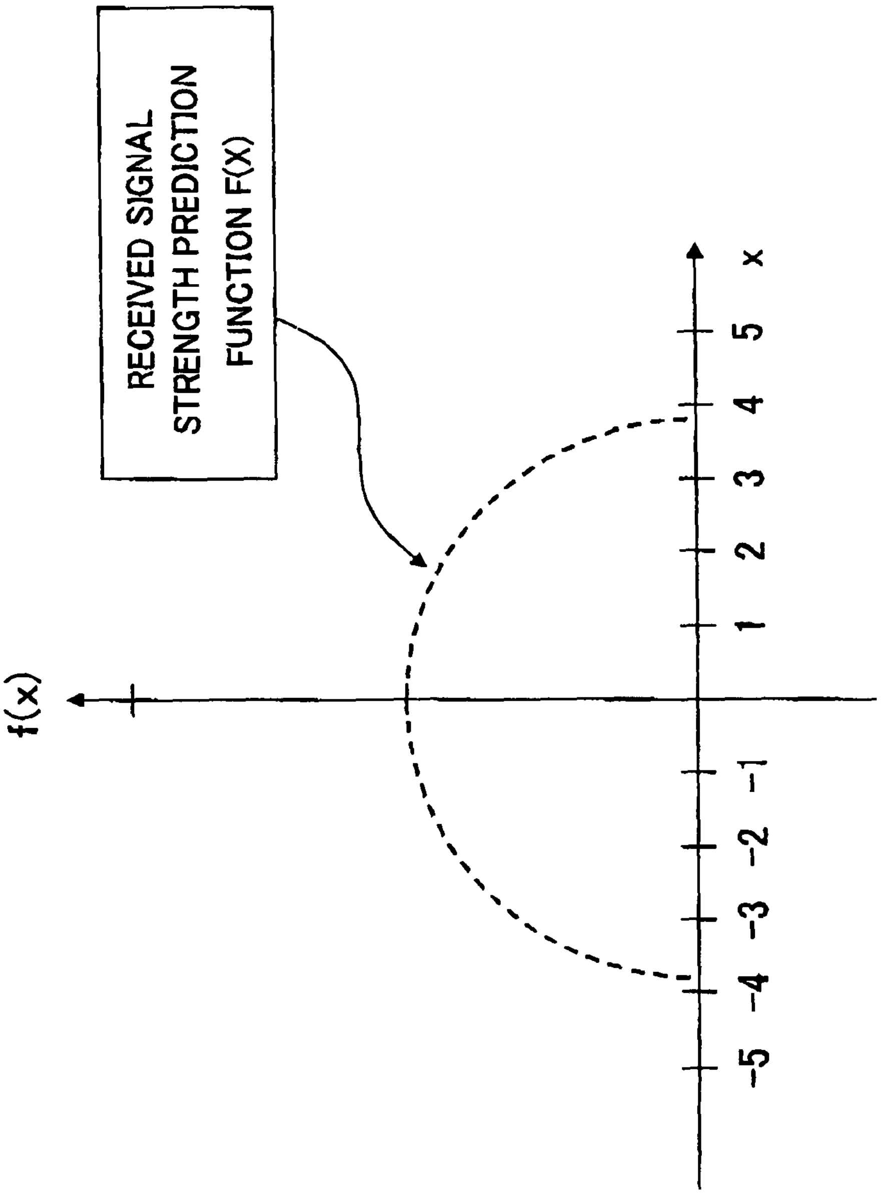
FIG. 27 is a diagram for explaining a received signal strength prediction function f(x).

The received signal strength prediction function f(x) is, for example, a quadratic function as shown in FIG. 27. Applicable examples of the received signal strength prediction function include a function obtained from a spread spectrum of frequency distribution, etc. and a function in consideration of a wave attenuation rate.

In addition, ranges of wireless channels m are different depending on wireless methods or countries. For example, in IEEE802.11b in U.S., a maximum range M of a wireless channel number is 11.

Since the maximum range M of the wireless channel number is different depending on the wireless method of a country, the range of the wireless channel m can be arbitrarily set or changed.

Since the received signal strength prediction function f(x) assumes a wave transmission spectrum, it becomes a function having x=0 that is a central frequency as a maximum value, as shown in FIG. 27.

In practice, a series of wireless signals received from the wireless base stations APs are used to perform an analysis process that will be described later so as to obtain a power spectrum density P(f), and a function f(x) that uses the obtained power spectrum density P(f) as a peak value becomes the received signal strength prediction function f(x).

The analysis process can directly perform Fourier transform on the series of wireless signals received from the wireless base stations APs to obtain the power spectrum density P(f).

For example, a case where a power spectrum density of a certain time waveform x(t) is P(f) means to provide a power Pt for a frequency component of an arbitrary infinitesimal interval (f, f+df), and Equation 3 is obtained:

$$Pt \equiv \frac{1}{|t_2 - t_1|}\int_0^{\infty}|x(t)|^2 dt = \int_0^{\infty} P(f)df \qquad \text{[Equation 3]}$$

where, t2 and t2 denote arbitrary times, and a definition of P(f) is represented by Equation 4.

$$P(f) \equiv \lim_{|t_2-t_1|\to\infty}\frac{1}{|t_2 - t_1|}\left|\int_{t_1}^{t_2} x(t)\exp(-j2\pi ft)dt\right|^2,\ f \geq 0 \qquad \text{[Equation 4]}$$

Since the aforementioned analysis process is difficult by using only existing information, a pseudo function f(x) is preferably calculated from a typical spectrum.

For example, in a case of IEEE802.11b/g, a function f(x) that represents a spectrum or spectrum mask disclosed in Non-Patent Document 1 is preferably used.

In IEEE802.11a, similarly, a function f(x) that represents a spectrum disclosed in Non-Patent Document 1 is preferably used.

In a case of IEEE802.11b/g, Equation 5 is preferably applied as a pseudo function f(x) that represents the aforementioned spectrum.

$$f(x) = \frac{\sin(\pi\times x)}{\pi\times x},\ x \neq 0 \qquad \text{[Equation 5]}$$

$$f(x) = 1,\ x = 0$$

Also, Equation 6 is preferably applied as a pseudo function f(x) that represents the aforementioned spectrum mask.

Accordingly, a process can be simplified as compared with a case where the function f(x) represented in Equation 5 is applied.

$$f(x)=10^{-5},\ x<2$$

$$f(x)=10^{-3},\ 1<x\leqq 2$$

$$f(x)=1,\ -1\leqq x\leqq 1$$

$$f(x)=10^{-3},\ -2\leqq x<-1$$

$$f(x)=10^{-5},\ x<-2 \qquad \text{[Equation 6]}$$

Control processes of the resource allocation apparatus 1 and the wireless base stations APs which constitute the wireless communication system according to the embodiment(s) may be executed by hardware, software, or a combination thereof.

When the control processes are executed through software, a program including a process sequence may be installed in a memory in dedicated hardware in a computer and executed, or installed in a general use computer that executes various processes and executed.

For example, the program may be stored in a computer-readable medium such as hard disks or read-only memories (ROMs) in advance.

Alternatively, the program may be temporarily or permanently stored in floppy disks, compact disc read-only memories (CD-ROMs), magneto optical (MO) disks, digital versatile discs (DVDs), magnetic disks, and removable recording media such as semiconductor memories. The removable recording media may be provided as so-called "package software."

In addition to the program being installed in a computer from the removable recording media, the program may be wirelessly transferred to a computer from a download site or through a network such as the Internet. The computer may receive the transferred program and install the program in a recording medium such as a hard disk.

The program may be executed according to the processes described in the exemplary embodiments in time series, or may be in parallel or individually executed according to a processing ability of an apparatus that performs the processes or as needed.

Further, the wireless communication system may have a logical group configuration of a plurality of apparatuses or may be constructed to combine functions of the apparatuses.

As described above, the exemplary embodiments have the following features.

In a resource allocation apparatus that allocates resource information used to perform wireless communication to wireless base stations, each of the wireless base stations may include an access-side wireless interface for covering wireless terminal devices and a backbone-side wireless interface for connecting the wireless base stations with each other, and the resource allocation apparatus may include a resource allocation unit that allocates resource information that is common to the wireless base stations to the backbone-side wireless interface that performs the wireless communication between the wireless base stations, and may allocate resource information that does not generate interference with the backbone-side wireless interface to the access-side wireless interface.

The resource allocation apparatus may further include a resource management unit that manages resource information allocated to the wireless base stations.

In the resource allocation apparatus, the resource management unit may manage the resource information according to at least one information of information on the number of wired interfaces of the wireless base station connected to an external network, information on the number of wireless interfaces mounted on the wireless base station, information on the number of connections of the wireless base station to adjacent wireless base stations, information on the number of wireless terminal devices covered by the wireless base station, and information that represents a position of the wireless base station.

The resource allocation apparatus may further include a grouping unit that groups wireless base stations that perform the wireless communication between wireless base stations, and the resource allocation unit allocates common resource information to the group.

In the resource allocation apparatus, the grouping unit may group a plurality of wireless base stations, and the resource allocation unit allocates the resource information so as not to generate interference between the plurality of groups.

The resource allocation apparatus according may further include a grouping management unit that manages the number of wireless base stations that are grouped into the groups.

In the resource allocation apparatus, the grouping management unit may manage the number of the wireless base stations, according to at least one information of information on the number of wired interfaces of the wireless base station connected to an external network in wired, information on the number of wireless interfaces mounted on the wireless base station, information on the number of connections of the wireless base station to adjacent wireless base stations, information on the number of wireless terminal devices covered by the wireless base station, and information that represents a position of the wireless base station.

A central control apparatus may include the aforementioned resource allocation apparatus and a control unit that performs central control on the wireless base stations.

A wireless base station may include the aforementioned resource allocation apparatus.

In a wireless communication system that may include wireless base stations and a resource allocation apparatus that allocates resource information used to perform wireless communication to the wireless base stations, each of the wireless base stations may include an access-side wireless interface for covering wireless terminal devices and a backbone-side wireless interface for connecting the wireless base stations with each other, and the resource allocation apparatus may include a resource allocation unit that allocates resource information that is common to the wireless base stations to the backbone-side wireless interface that performs the wireless communication between the wireless base stations, and allocates resource information that does not generate interference with the backbone-side wireless interface to the access-side wireless interface.

In the wireless communication system, the resource information may be a wireless channel, the wireless base station may include a measurement unit that measures channel information on each wireless channel, and a calculation unit may calculate channel scan information used to avoid interference with respect to each wireless channel on the basis of channel information on each wireless channel measured by the measurement unit, the resource allocation apparatus may include an acquisition unit that acquires the channel scan information calculated from each wireless channel by the calculation unit from the wireless base station, and the resource allocation unit allocates a wireless channel that is common to wireless base stations to the backbone-side wireless interface that performs wireless communication between wireless base stations and allocates a wireless channel that does not generate interference with the backbone-side wireless interface to the access-side wireless interface on the basis of the channel scan information on each wireless channel acquired by the acquisition unit.

In the wireless communication system, the wireless base station may include a prediction unit that predicts an interference region of a wireless channel that generates interference on the basis of the channel information on each wireless channel measured by the measurement unit, and the calculation unit may calculate the channel scan information on each wireless channel on the basis of the interference region of the wireless channel predicted by the prediction unit and the channel information on each wireless channel measured by the measurement unit.

In the wireless communication system, the resource allocation apparatus may be a central control apparatus for performing central control on the wireless base stations.

In the wireless communication system, the resource allocation apparatus may be the wireless base station.

In a resource allocation to be method performed in a resource allocation apparatus that may allocate resource information used to perform wireless communication to wireless base stations, each of the wireless base stations may include an access-side wireless interface for covering wireless terminal devices and a backbone-side wireless interface for connecting the wireless base stations with each other, and the resource allocation apparatus may perform resource allocation processes of allocating resource information that is common to the wireless base stations to the backbone-side wireless interface that performs the wireless communication between the wireless base stations and allocating resource information that does not generate interference with the backbone-side wireless interface to the access-side wireless interface.

In the resource allocation method, the resource allocation apparatus may be a central control apparatus for performing central control on the wireless base stations.

In the resource allocation method, the resource allocation apparatus may be the wireless base station.

In a resource allocation method to be performed in a system that may include wireless base stations and a resource allocation apparatus that may allocate resource information used to perform wireless communication to the wireless base stations, each of the wireless base stations may include an access-side wireless interface for covering wireless terminal devices and a backbone-side wireless interface for connecting the wireless base stations with each other, and the resource allocation apparatus may perform resource allocation processes of allocating resource information that is common to the wireless base stations to the backbone-side wireless interface that may perform the wireless communication between the wireless base stations and allocating resource information that does not generate interference with the backbone-side wireless interface to the access-side wireless interface.

In the resource allocation method, the resource allocation apparatus may be a central control apparatus for performing central control on the wireless base stations.

In the resource allocation method, the resource allocation apparatus may be the wireless base station.

In a resource allocation program stored in a computer-readable medium for a resource allocation apparatus that may allocate resource information used to perform wireless communication to wireless base stations, each of the wireless base stations may include an access-side wireless interface for covering wireless terminal devices and backbone-side wireless interface for connecting the wireless base stations with each other, the program causing a computer to perform resource allocation processes of allocating resource information that is common to wireless base stations to the backbone-side wireless interface that may perform the wireless communication between wireless base stations and allocating resource information that does not generate interference with the backbone-side wireless interface to the access-side wireless interface.

In the resource allocation program, the resource allocation apparatus may be a central control apparatus for performing central control on the wireless base stations.

In the resource allocation program, the resource allocation apparatus may be the wireless base station.

Note that the resource allocation apparatus, the central control apparatus, the wireless base station, the wireless communication system, the resource allocation method and the resource allocation program in a computer-readable medium according to the aforementioned exemplary embodiments may be applied to allocate resource information so as to reduce interference, when the wireless base stations APs including a plurality of wireless network interfaces are connected to each other.

In addition, communication channel allocation to wireless communication apparatuses that have a limited usable frequency band such as mobiles phones, transceivers, and radio controls may be applied in addition to the wireless base stations APs.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:

1. A wireless communication system comprising:

wireless base stations and a resource allocation apparatus that allocates resource information used in performing wireless communication to the wireless base stations, the wireless base stations comprise an access side wireless interface configured for covering wireless terminal devices and a backbone-side wireless interface configured for connecting the wireless base stations with each other, the resource allocation apparatus includes a resource allocation unit that allocates a part of the resource information that is common to the wireless base stations to the backbone-side wireless interface that performs the wireless communication between, the wireless base stations, and allocates another part of the resource information that generates other than interference with the backbone-side wireless interface to the access-side wireless interface, wherein the resource information comprises a wireless channel, the wireless base stations comprise a measurement unit that measures channel information on each wireless channel, and a calculation unit that calculates channel scan information, used to avoid interference, with respect to said each wireless channel on a basis of channel information on said each wireless channel measured by the measurement unit, the resource allocation apparatus comprises an acquisition unit that acquires the channel scan information calculated from said each wireless channel by the calculation unit from the wireless base station, the resource allocation unit allocates the wireless channel when the wireless channel common to the wireless base stations to the backbone-side wireless interface that performs wireless communication between the wireless base stations, and allocates the wireless channel when the wireless channel generates other than interference with the backbone-side wireless interface to the access-side wireless interface, on a basis of the channel scan information on said each wireless channel acquired by the acquisition unit, wherein the wireless base stations include a prediction unit that predicts an interference region of the wireless channel when the wireless channel generates interference on a basis of the channel information on said each wireless channel measured by the measurement unit, and the calculation unit calculates the channel scan information on said each wireless channel on a basis of the interference region of the wireless channel predicted by the prediction unit and the channel information on said each wireless channel measured by the measurement unit.

* * * * *